Feb. 16, 1965  N. C. L. BROWN  3,169,736
RAILWAY CAR RETARDERS AND CONTROL THEREOF
Filed May 6, 1954  13 Sheets-Sheet 2
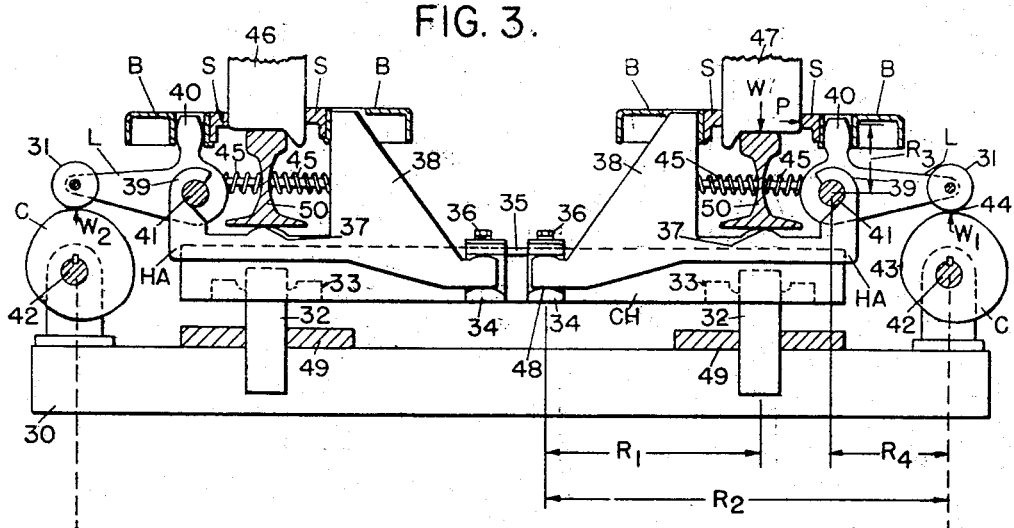
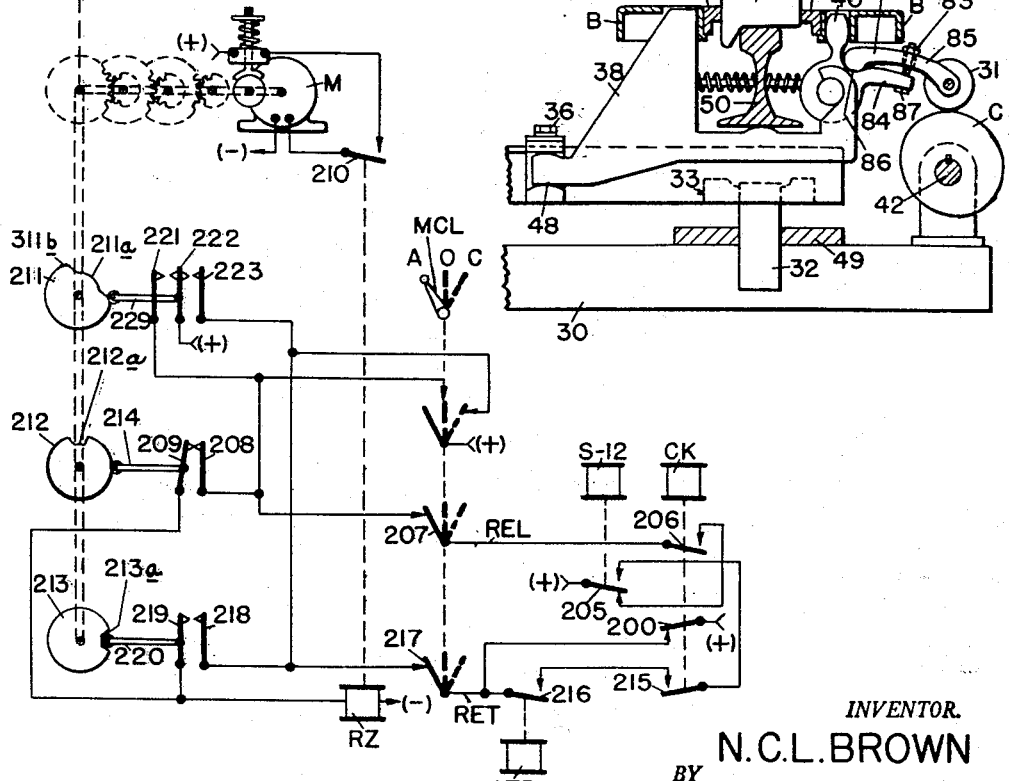
INVENTOR.
N.C.L.BROWN
BY
Forest B. Hitchcock
HIS ATTORNEY

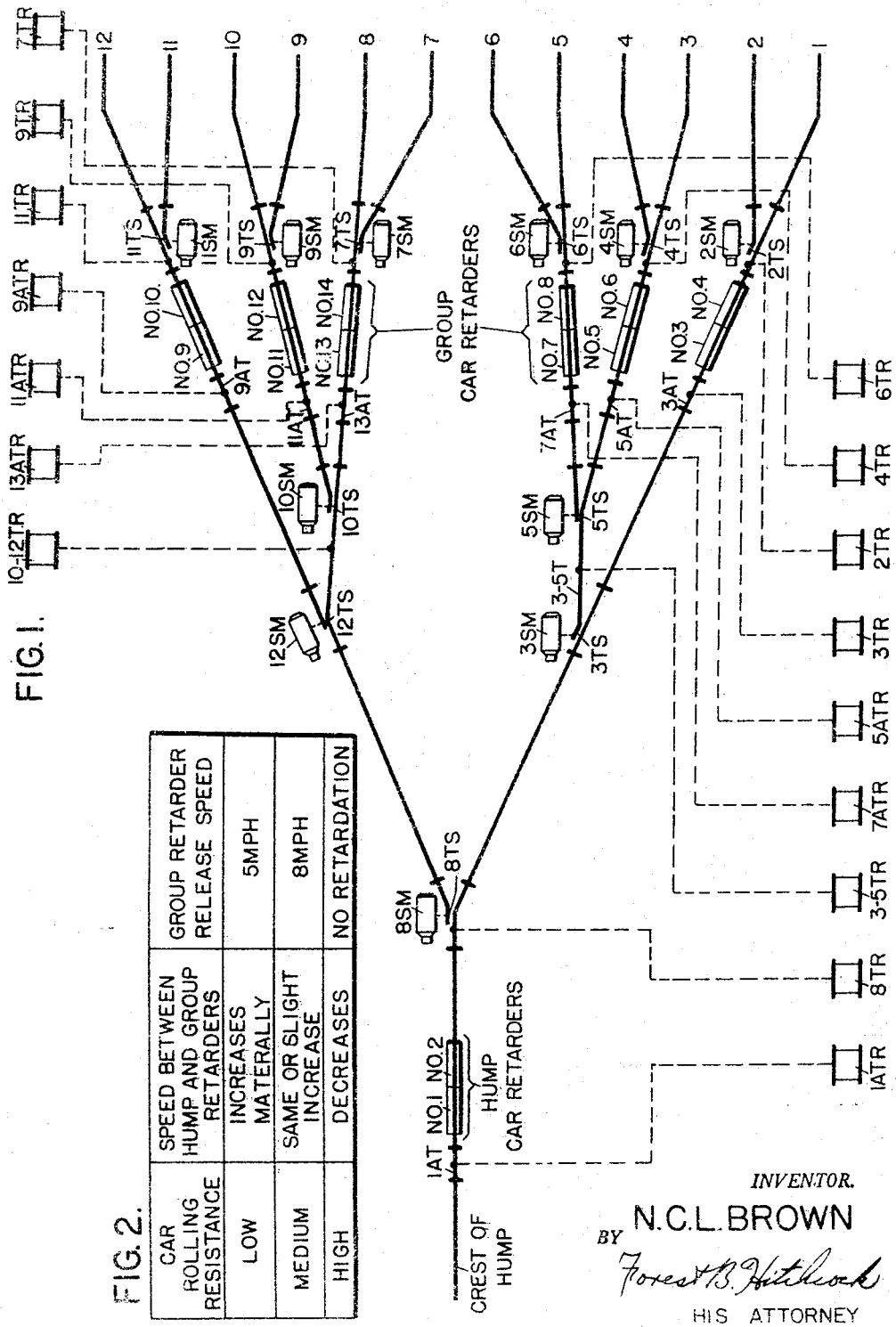

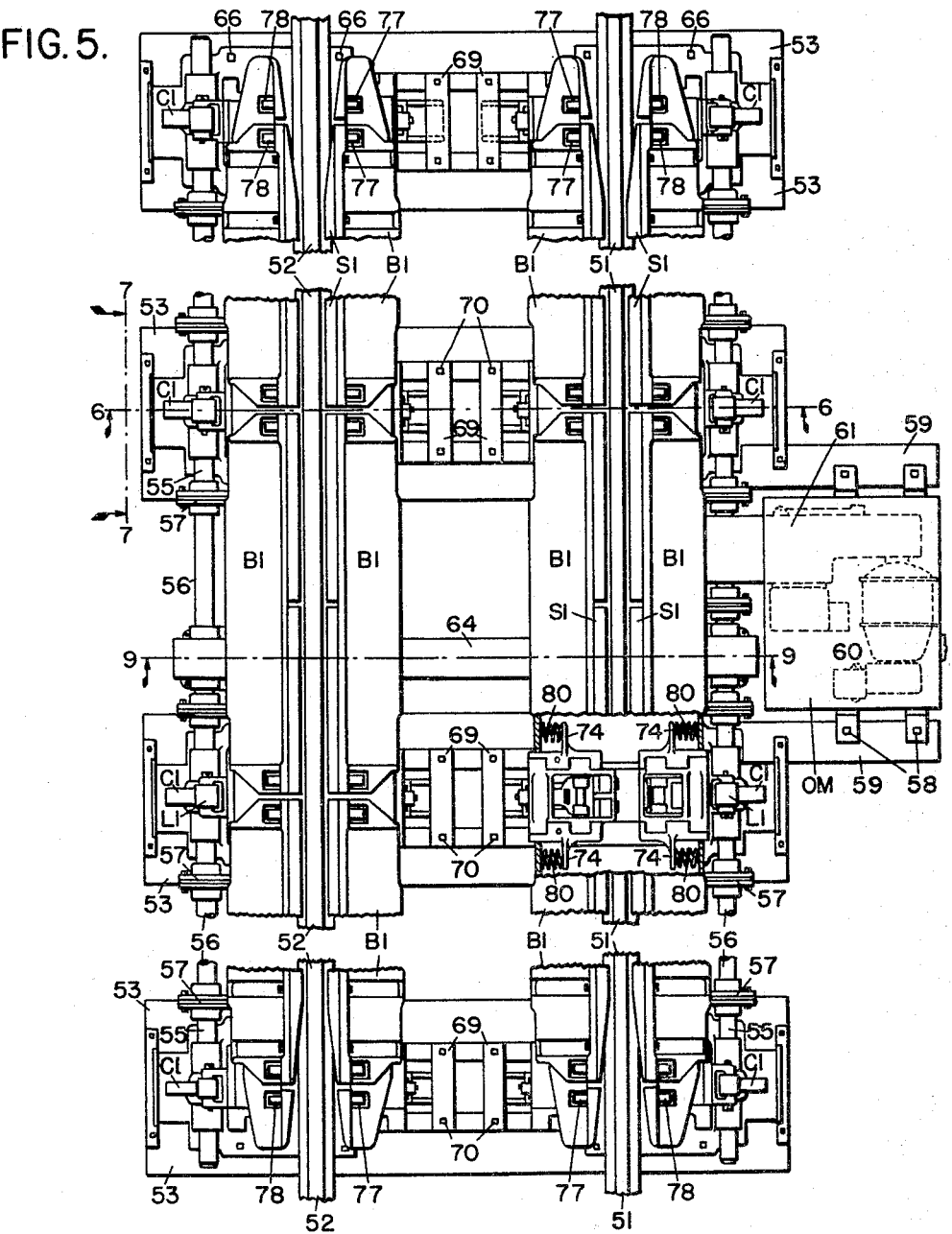

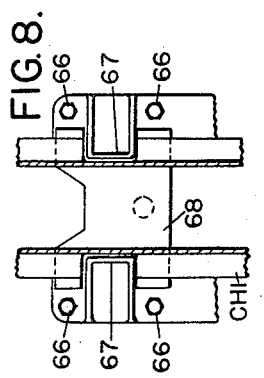

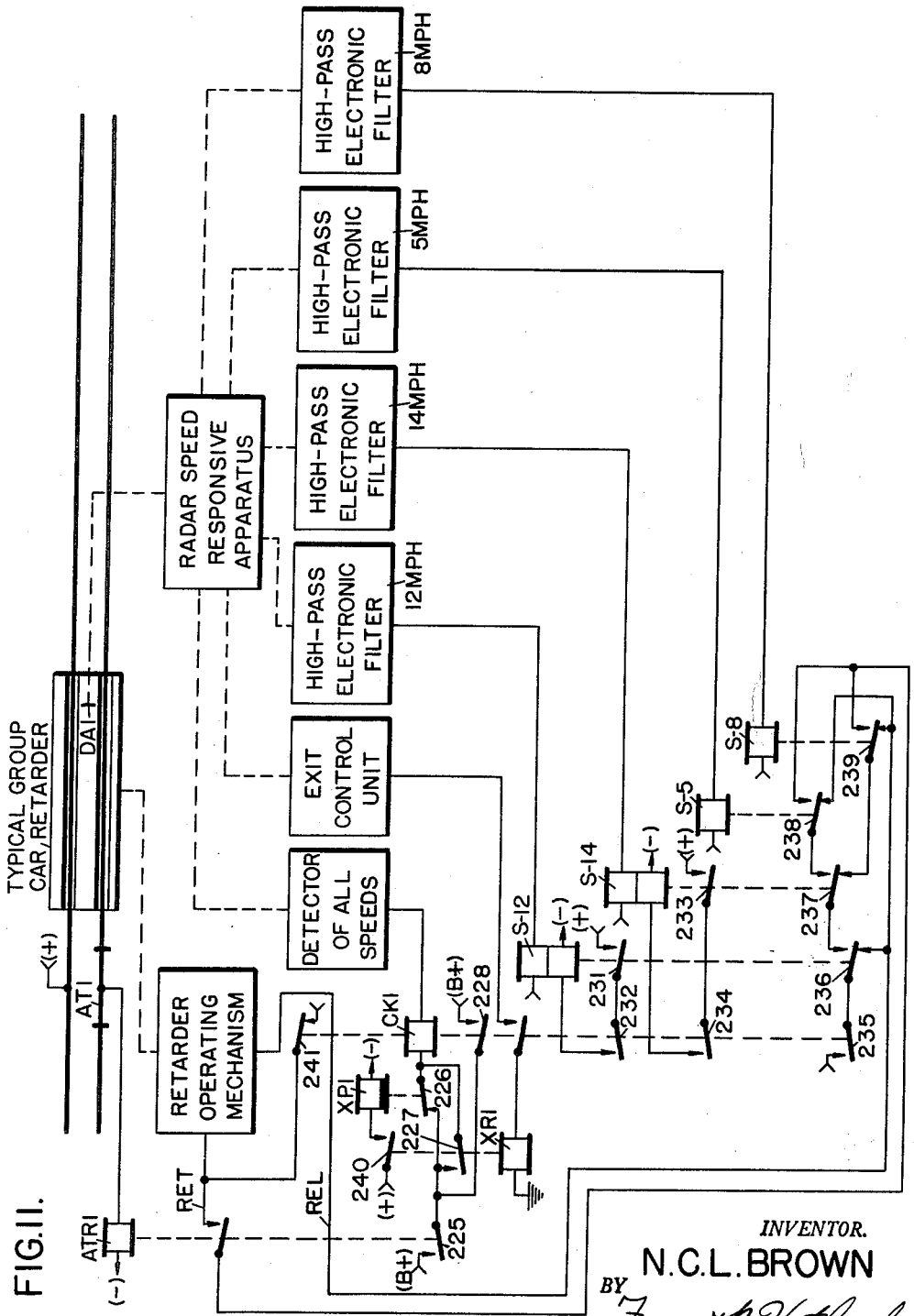

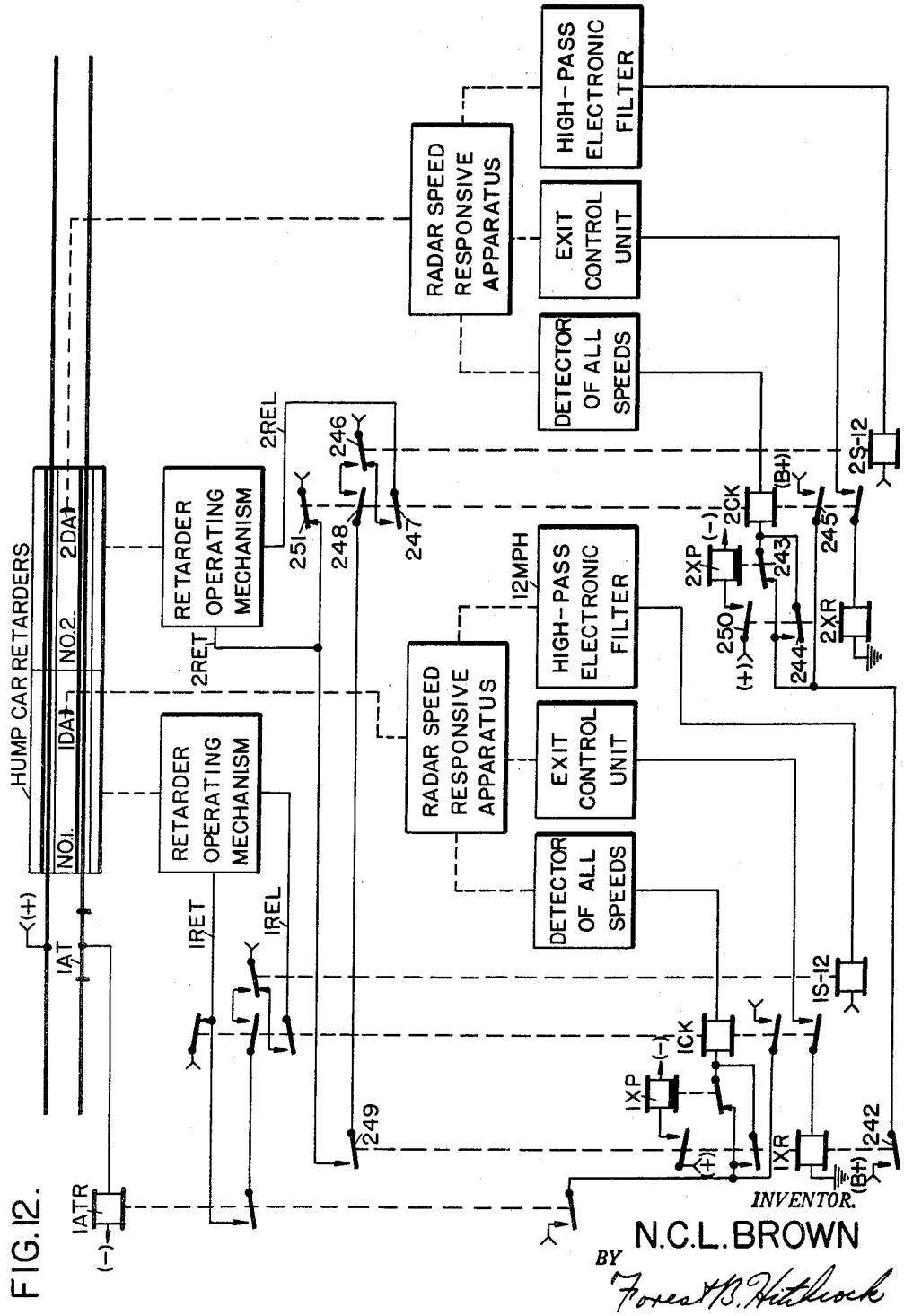

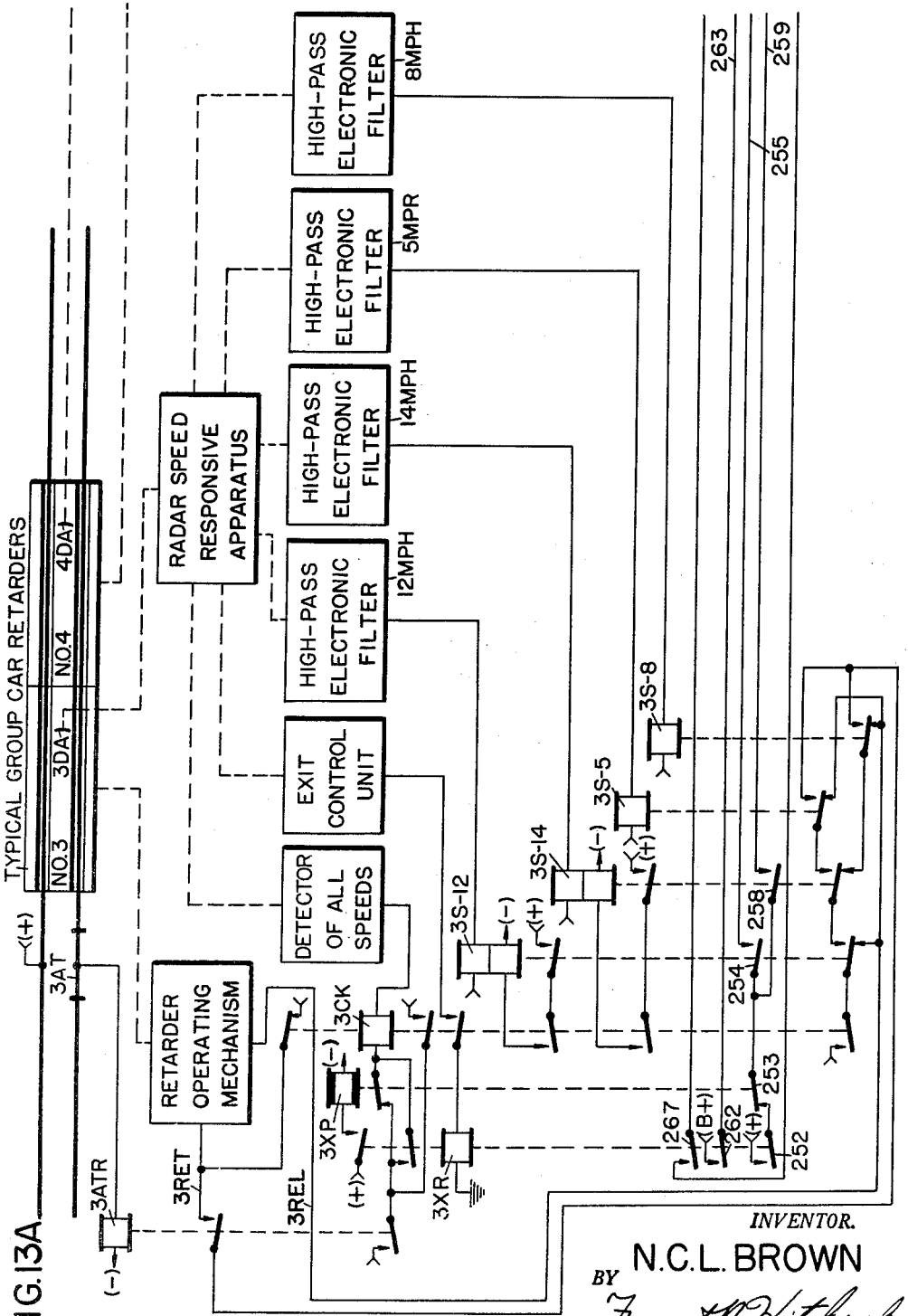

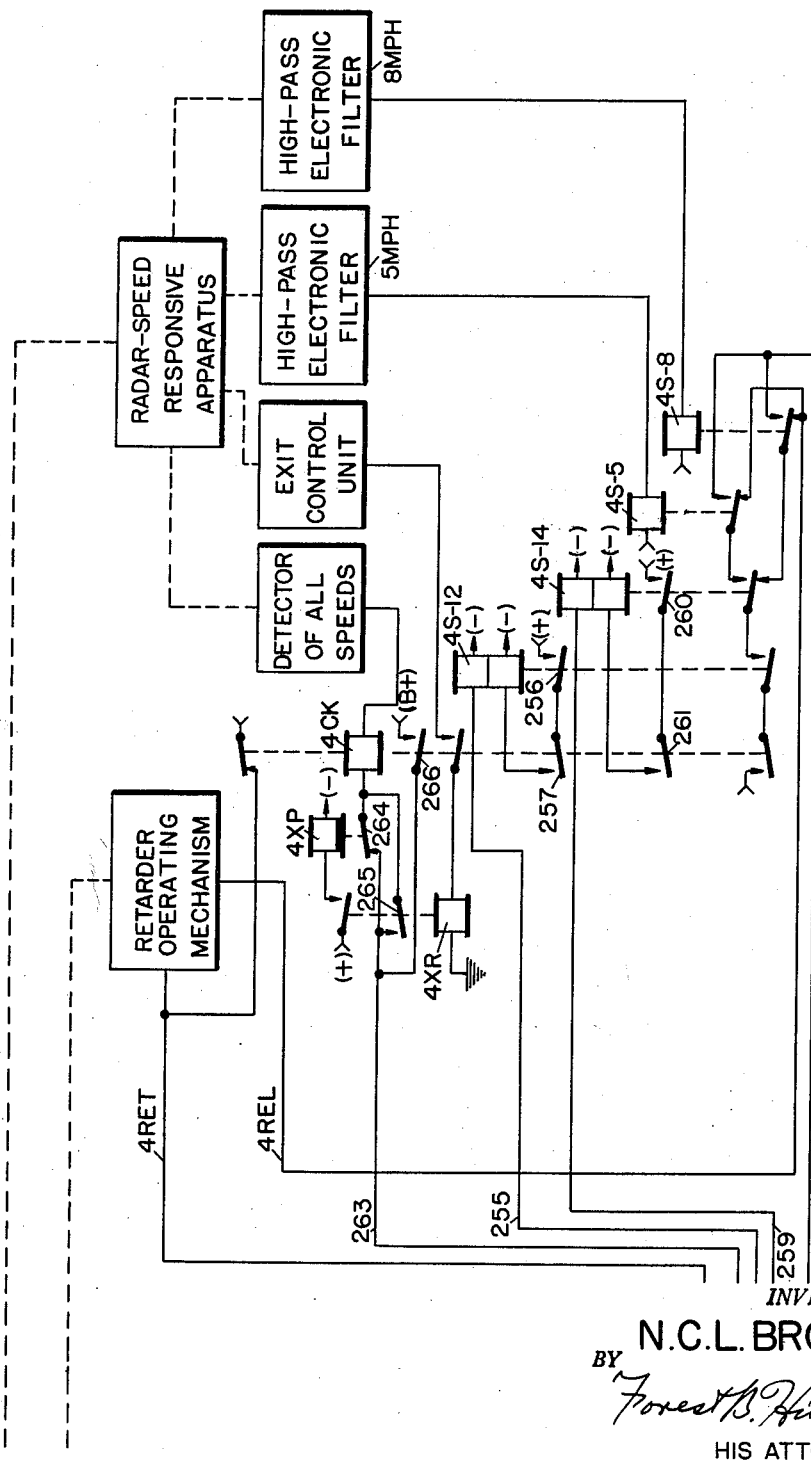

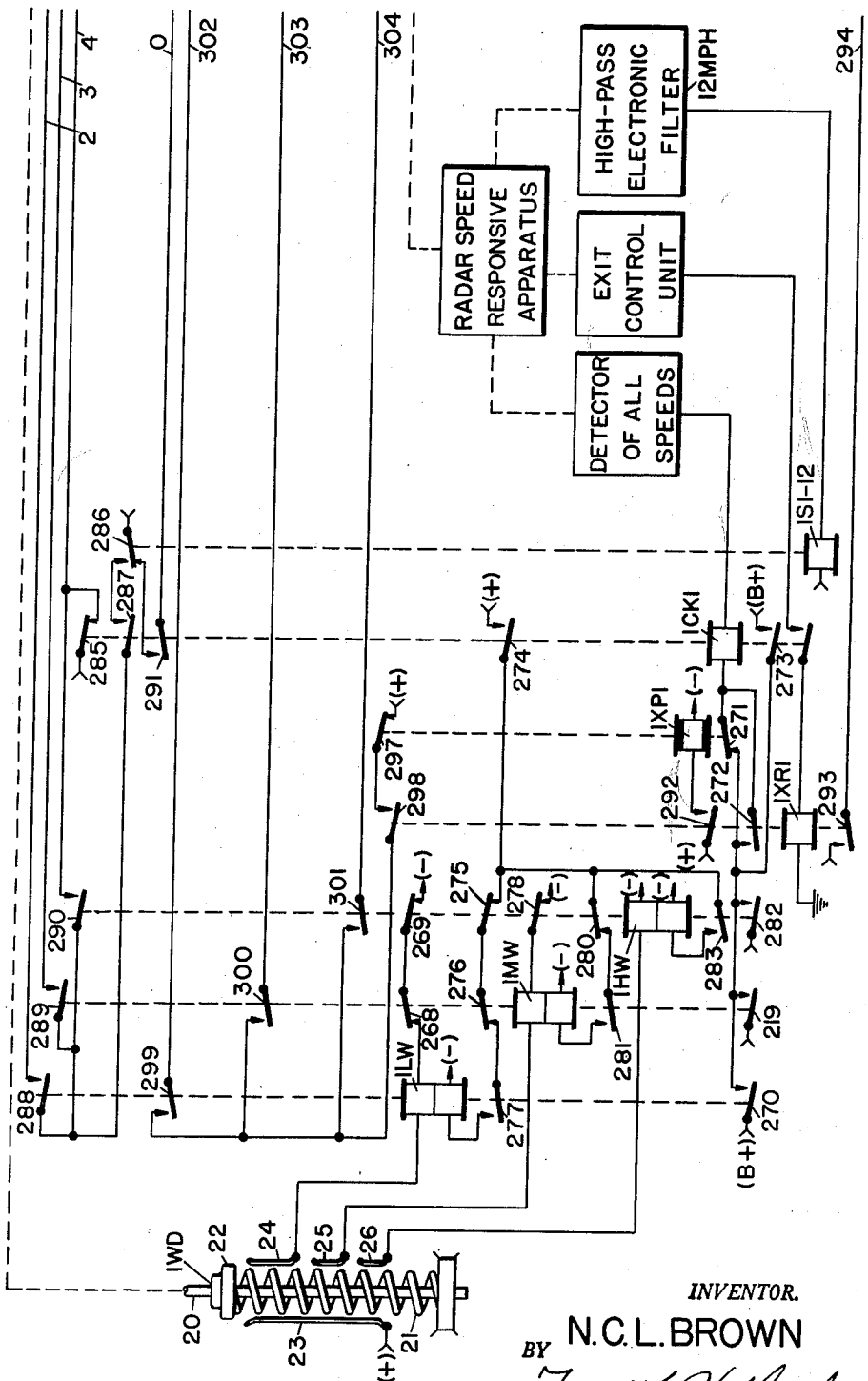

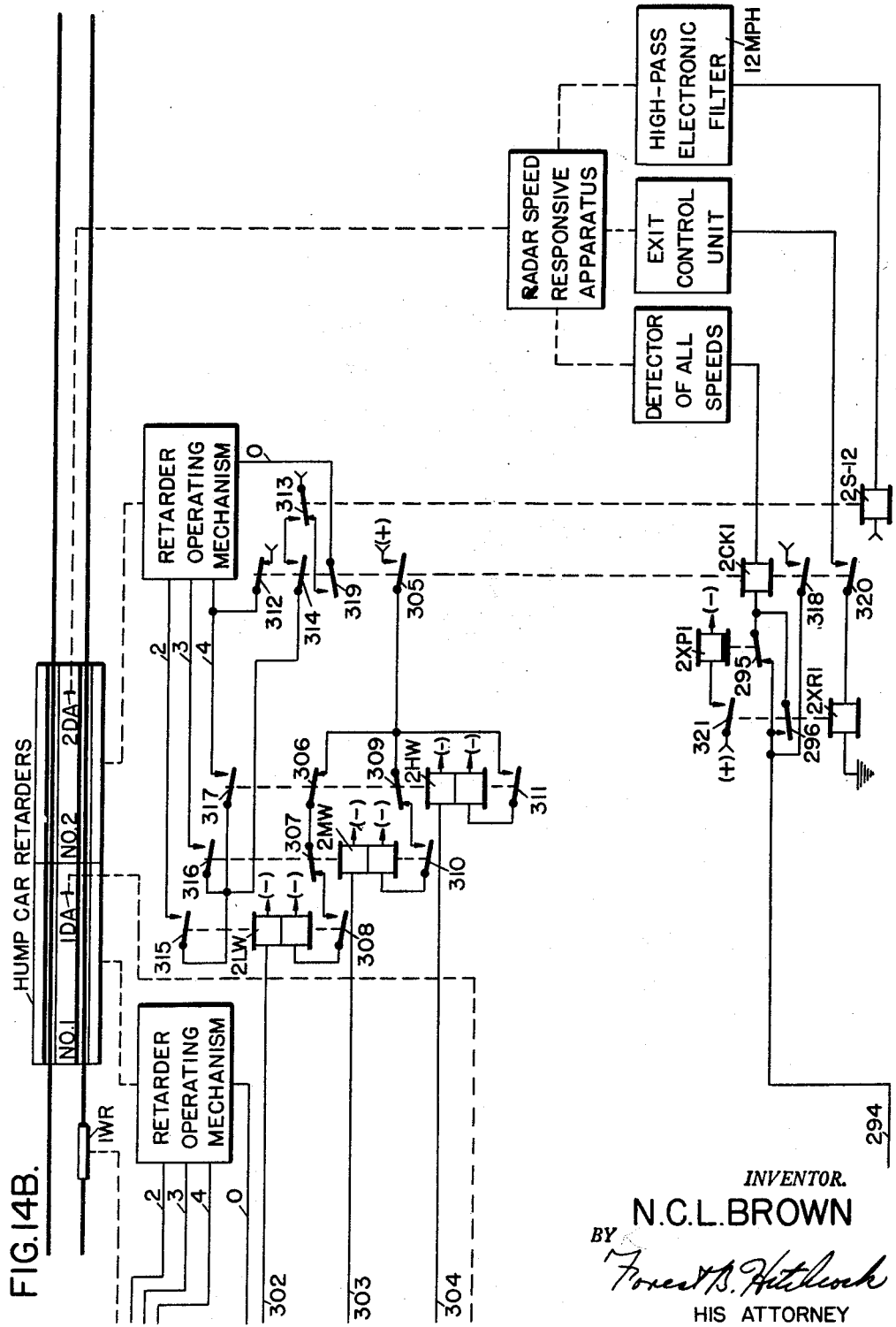

Feb. 16, 1965  N. C. L. BROWN  3,169,736
RAILWAY CAR RETARDERS AND CONTROL THEREOF
Filed May 6, 1954  13 Sheets-Sheet 12

INVENTOR.
N.C.L. BROWN
BY
*Forest B. Hitchcock*
HIS ATTORNEY

INVENTOR.
N.C.L. BROWN
BY
HIS ATTORNEY

United States Patent Office 3,169,736
Patented Feb. 16, 1965

3,169,736
RAILWAY CAR RETARDERS AND
CONTROL THEREOF
Ned C. L. Brown, Scottsville, N.Y., assignor to General Signal Corporation, a corporation of New York
Filed May 6, 1954, Ser. No. 428,012
7 Claims. (Cl. 246—182)

This invention relates to the automatic control of the speed of railway cars, and it more particularly pertains to track brake car retarders of the weight-automatic type, and systems for governing the automatic release of pressure against the rims of wheels of cars passing through track brake type car retarders.

Car retarders of the track brake type are used primarily to regulate the speed of cars in hump classification yards, wherein cars and cuts of cars are released at the crest of a hump and allowed to coast to respective classification tracks. In such systems the crest of the hump must be high enough for the hardest rolling and lightest car to be able to coast to the most distant destination in a classification track. The speed of the cars varies materially because of different car weights, the cars being hard or easy rolling, windage, etc.

According to the present invention, there are two stages to which retardation is applied to cars as they progress from the hump to their respective classification tracks. The car retarders of the first stage are conveniently called "hump retarders," and the car retarders of the second stage are conveniently called "group retarders." The hump retarders are located in the single track leading off of the crest of a hump, while the group retarders are located in various branches of a yard layout feeding respective groups of classification tracks.

Generally speaking and without attempting to define the scope of the present invention, the car retarder system according to the present invention comprises radar type speed responsive means for each car retarder having a directional antenna located near the exit end of the associated car retarder, and directed toward approaching cars, and car retarder releasing means automatically governed by the speed of the cars to release the car retarders at predetermined car speeds. All cars are released by the hump car retarders when their speed is reduced to the same predetermined value, but the release of the group car retarders is automatically governed by the performance of a car in travelling from the hump retarders to the group retarders. The radar speed detecting means is used at group retarders to indicate the speed of the cars upon entering the group retarders. Thus, knowing the speed at which the cars have left the hump car retarders and the speed at which the cars approach the group car retarders, the rollability or performance of each car is determined as being a car having low, medium or high rolling resistance. These rollability characteristics are then used to select respective desired exit speeds for cars leaving the group retarders so that these cars will reach their respective destinations travelling at speeds to prevent damage when coupling up with other cars on the same classification tracks.

A weight-automatic car retarder which can have its brake shoes released from pressure against a car wheel automatically and relatively quickly, is provided according to the present invention. This car retarder, when used as a double rail car retarder, together with the track rails, is supported entirely on motor operated cams disposed at opposite sides of the track. These cams are normally positioned for weight-automatic retardation of a car entering the car retarder with control means being provided for opening the car retarders by operation of the cams supporting the car retarders in response to the detection of selected car speeds by the associated radar speed responsive apparatus.

An object of the present invention is to determine the rolling resistance of each railway car by checking its acceleration or deceleration in travelling over a predetermined stretch of track in the progress of the cars from the hump to their classification tracks.

Another object of the present invention is to use the trackway between the hump car retarders and the group car retarders as checking sections for determining the rollability of the cars in accordance with their performance over this check section of track.

Another object of the present invention is to release the group car retarders for car speeds selectively determined by the performance of the cars prior to entering the group car retarders.

Another object of the present invention is to release the group car retarders for car speeds selectively determined by the change in speed of the cars between the point of leaving the hump car retarders and the point of entering the group car retarders.

Another object of this invention is to retard cars in a classification yard by weight-automatic car retarders subject to automatic release at predetermined speeds by speed detecting means.

Another object of the present invention is to provide power release means for weight-automatic car retarders.

Another object of the present invention is to provide a weight-automatic car retarder having relatively quickly operated power release as compared to the time required to restore the car retarder to its closed position.

Another object of the present invention is to provide power driven cam releasing means for a car retarder wherein substantially greater travel of the cams is required for restoration of the car retarder to a closed position as compared to the travel of the cams to release the car retarder.

Another object of the present invention is to provide an improved car retarder of the weight-automatic type of relative rugged construction having a small number of operating parts and linkages.

Other objects, purposes and characteristic features of the present invention will be in part obvious from the accompanying drawings and in part pointed out as the description of the invention progresses.

In describing the invention in detail, reference is made to the accompanying drawings in which parts having similar functions are generally identified by similar letter reference characters, and in which:

FIG. 1 is a typical track layout to which the present embodiments of the invention are applied;

FIG. 2 is a tabulation showing group retarder release speeds which are employed in accordance with cars having different rolling characteristics;

FIG. 3 illustrates somewhat schematically one embodiment of an improved weight-automatic car retarder provided according to the present invention together with a typical control circuit for governing its power operation;

FIG. 4 is a modified form of the car retarder according to FIG. 3 providing for adjustment of the brake shoes;

FIG. 5 is a plan view of a weight-automatic car retarder constructed according to the present invention;

FIG. 6 is an elevational sectional view of the car retarder illustrated in FIG. 5 taken along the section line 6—6 of FIG. 5;

FIG. 7 is an elevational view of the section of the car retarder, shown partly in cross section, taken along the line 7—7 of FIG. 5;

FIG. 8 is a plan view of a portion of a car retarder, shown partly in cross section, taken along the line 8—8 of FIG. 7;

FIG. 9 is an elevational view, shown partly in cross section, of a portion of a car retarder taken along the line 9—9 of FIG. 5;

FIG. 11 illustrates the organization for one embodiment of the present invention for the control of a group car retarder of the weight-automatic type;

FIG. 12 illustrates an organization for the control of hump car retarders where a plurality of adjoining weight-automatic car retarders are employed;

Figure 15A:
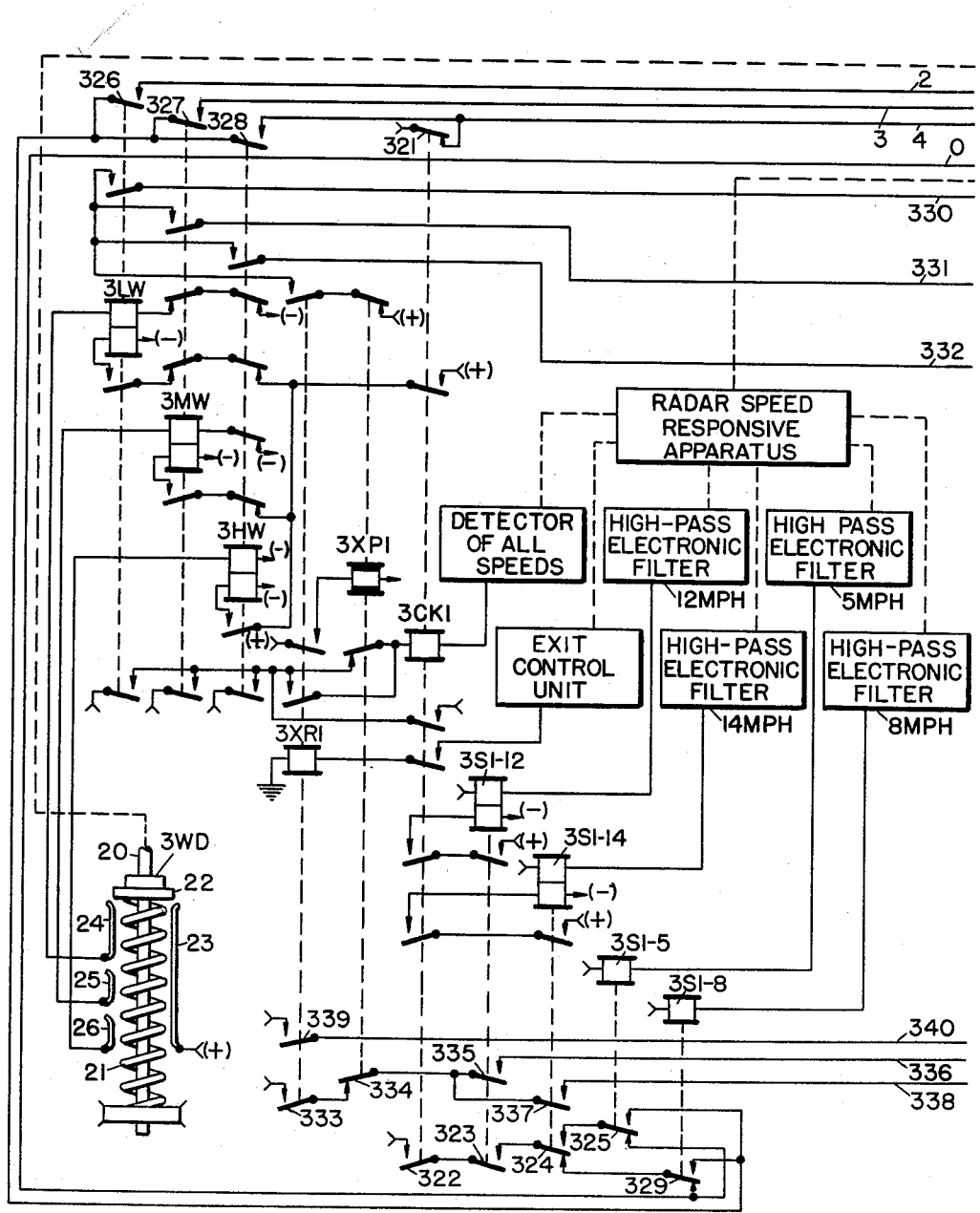
Figure 15B:
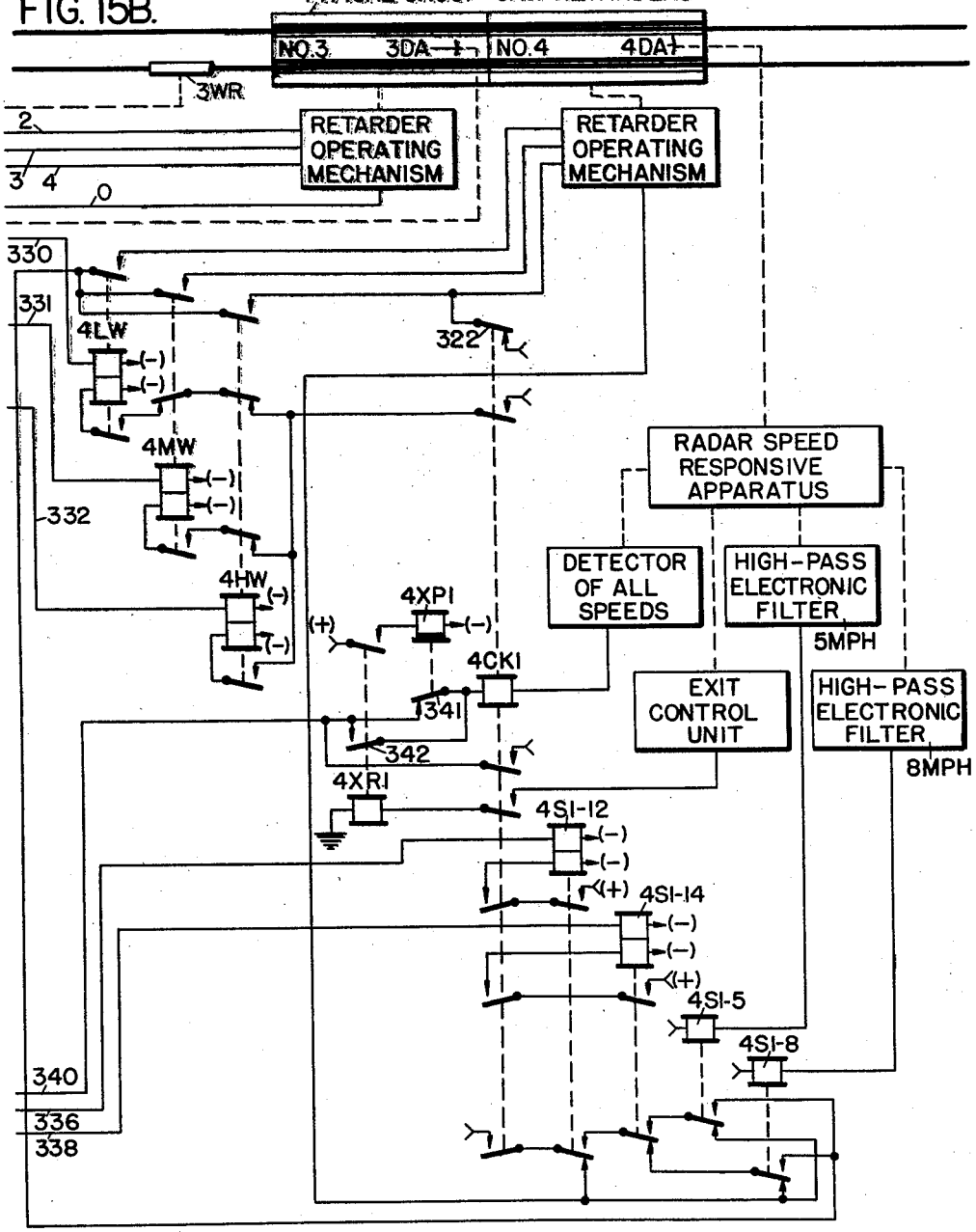

FIGS. 13A and 13B when placed side by side illustrate an organization for the control of a plurality of group car retarders of the weight-automatic type;

FIGS. 14A and 14B when placed side by side, illustrate an organization for the control of a plurality of adjoining hump car retarders having spring actuated brake shoes and adjustable by power operation for different degrees of retardation; and FIGS. 15A and 15B when placed side by side illustrate a circuit organization for the control of a plurality of adjoining group car retarders having brake shoes of the spring operated type with power operated means for governing the degree of retardation.

For the purpose of simplifying the illustrations and facilitating in the explanation of the invention, the various parts and circuits constituting the embodiments of the invention have been shown diagrammatically and conventional illustrations have been employed, the drawings having been organized more with the purpose of facilitating the understanding of the principles and mode of operation of the invention than with the idea of illustrating the specific construction and arrangement of parts that would be employed in practice. The symbols (+) and (—) are employed to indicate connections to the positive and negative terminals of suitable batteries or other sources of direct current and the symbol (B+) is used to indicate connection to the positive terminal of a high voltage "B" power supply used in the radar equipment employed, the negative terminal of this power supplied being assumed to be connected to ground.

With reference to FIG. 1, the track layout for which the system according to the present invention is assumed to be provided has 12 classification tracks which are fed with cars from a hump. A junction switch 8TS is the first switch to be encountered by a car progressing from the hump, and this switch is operated by a suitable switch machine 8SM. The next track switches are lap switches 3TS and 5TS for one leg of the track layout and 12TS and 10TS for the other leg. These track switches are operated by power switch machines SM according to the usual practice. Beyond the lap switches, car retarders are provided which are known as "group retarders," such, for example, as car retarders Nos. 3 and 4 which are used in braking a car if the car is progressing to track 1 or track 2. The track switches 2TS, 4TS, 6TS, 7TS, 9TS and 11TS select the particular classification tracks for cars leaving the group retarders.

According to actual practice, the track layout of a hump classification yard generally includes a much greater number of tracks, and it is to be understood that the simplified yard layout of FIG. 1 is selected to facilitate the disclosure of the invention by reason of its simplicity and that the systems herein disclosed are readily adaptable for use in larger track layouts. These larger track layouts generally have as many as 8 classification tracks that are fed from each stretch of track including a pair of group car retarders such as the car retarders Nos. 3 and 4.

The car retarders for the embodiments of the invention illustrated in FIGS. 10, 11, 12 and 13 are assumed to be of the weight-automatic type in that the amount of pressure applied by the brake shoes of the retarders is automatically adjusted in accordance with the weight of the cars passing through the retarders. These weight-automatic car retarders can be of the type illustrated, for example, in FIGS. 3, 4, 5, 6, 7, 8 and 9.

The general structure of the weight-automatic car retarder will be more readily understood with reference to the simplified and somewhat schematic view as shown in FIG. 3. The car retarder as illustrated in FIG. 3 comprises rotary cams C disposed at the opposite sides of the track way which support the entire weight of the cars passing through the car retarder, channels CH extending transverse of the trackway underneath the track rails and between certain of the ties 30, hook arms HA pivotally secured to the channels CH at one end, and floating levers L engaging the hook arms HA at the other end and operatively engaging shoe beams B which in turn carry brake shoes S which bear against the sides of the wheels of cars passing through the car retarder. The floating levers L have rollers 31 which bear upon the tops of the cams C and thereby support the weight of the car retarder and the cars passing therethrough. The car retarder is kept on gauge laterally by suitable bearings 32 secured to the ties 30 and projecting upwardly on the ties 30 between bearing lugs 33 which are suitably secured to the channels CH.

To consider the structure more specifically, each of the hook arms HA is pivotally secured on an arcuate pad 34 at its innermost extremity between the track rails and the pads 34 are in the form of yokes secured to the channels CH by bolts 36. Each of the hook arms HA extends under the associated track rail between two channel members CH, and it is formed with an arcuate boss 37 in its upper surface, beneath the center of the rail, against which pressure is applied in accordance with the pressure applied to the track rail by a car passing thereover. Hook arms HA have upwardly extending portions 38 inside of the track rails engaging the inside shoe beams B. Outside upwardly extending hook portions 39 engage the floating levers L.

The floating levers L have upwardly extending lugs 40 engaging the ends of the respective outside shoe beams B. The floating levers L have pins 41 beneath the lugs 40 over which the hooks 39 of the hook arms are disposed. The outer extremity of each of the floating levers L carries a roller 31 which in turn rides on the upper surface of an associated cam C in substantial vertical alignment above a shaft 42 upon which the cams C are rotatably secured.

The cams C are subject to simultaneous power operation, always in a clockwise direction, substantially one-quarter of a turn being required for operation of the rollers 31 from the highest to the lowest bearing portion on the cams and three-quarters of a turn being required for operating the rollers 31 from the lowest portion of the cams C to the highest portion. Thus, the cams C are graduated down to the lowest point 43 substantially 90° from the highest point 44. This provides for relatively quick release as compared to the three-quarters of a revolution of the cam C required to close the car retarder. Thus the graduation from the low to high points on the cams C is more gradual in accordance with heavier loads placed on the operating mechanism to close the car retarder as compared to opening it.

Compression springs 45 bearing against the opposite sides of the track rails are provided for maintaining the hooks 39 of the hook arms HA in engagement with the pins 41 of the floating levers L when there is no car within the car retarder.

Before considering further specific structure, adjustments and the like, consideration will be given as to the relative amounts of pressure applied to the car wheels as compared to the car weights. It will be assumed that the car wheels 46 and 47 shown in FIG. 3 carry equal weights and thus the wheels apply equal loads. $W_1$ represents the load applied to the right-hand support and $W_2$ represents the load applied to the left-hand support. It will be further assumed, for the purpose of facilitating an understanding of the calculations, first that the invention is used as a single rail retarder in which the right-hand hook arm HA rests on the tie rather than on the channel CH. P represents the pressure between the brake shoes S, $R_1$ represents the moment arm from the pivot point of the right hand hook arm HA to the point of application of the load by the associated rail, $R_1$ represents the moment arm from the pivot point 48 of the right hand hook arm HA to the right hand point of support on which the weight $W_1$ is applied, $R_3$ is the moment arm from the pin 41 to the point of application of the pressure P, and $R_4$ represents the moment arm from the pivot pin 41 to the right hand point of support at which the weight $W_1$ is applied.

Since all of the parts are in equilibrium, we can take moments about the pivot point 48 wherein:

$$W_1 R_2 = W R_1$$

$$W_1 = \frac{WR_1}{R_2}$$

also by moments:

$$PR_3 = W_1 R_4$$

substituting for $W_1$, $$PR_3 = \frac{WR_1}{R_2} \times R_4$$

and $$P = W \frac{R_1 R_4}{R_2 R_3}$$

thus the lever ratio is:

$$\frac{R_1 R_4}{R_2 R_3}$$

and $P:W = R_1 R_4 : R_2 R_3$

In this manner, the desired pressure is obtained by the lengths of the moment arms being chosen to give the desired lever ratio. It will be noted that where the hook arms HA are supported on the ties as has been assumed for the calculations, substantially half of the weight applied to the track rail by a car is supported by the ties and thus only one quarter of the weight of the car is applied to the tops of the cams C as useful weight in applying brake shoe pressure. However, when double rail retardation is provided, half of the weight of the car is supported by the cams at one side of the track, and thus twice the pressure is applied as compared to single rail retardation. It has been found that good results can be obtained with a lever ratio of substantially 2:1, providing a pressure of about twice the weight W applied by a car wheel.

In practice, the car retarder according to FIG. 3 is normally closed in that the cams C are in their highest positions as shown, and with no cars in the car retarder, the channels CH rest on suitable plates 49 extending across the ties and the brake shoes S are closed to a spacing less than the width of a car wheel.

At the entering end of the car retarder, the brake shoes are flared outwardly as shown in FIG. 5 for receiving a car wheel. A car wheel entering the flaring end of the car retarder spreads the shoes S apart and in so doing raises the channels CH off of the plates 49 so that the entire weight applied to the track rails is supported solely on the cams C, and braking pressure is applied to the shoes S through the floating levers L according to the above described lever ratio. The weight applied to the rails 50 is carried by the hook arms HA which tend to cause the supporting floating levers L to drop, the hooks 39 pivoting on the pins 41. It will be noted that the car retarder is self-adjusting for different width wheels in that the channels CH are raised higher as the shoes S are spread farther apart by the wider wheels, braking pressure being applied in accordance with the lever ratio, irrespective of the wheel width.

Having thus considered the general construction and mode of operation of the weight-automatic car retarder with reference to the somewhat schematic illustration of FIG. 3, consideration will now be given to the specific car retarder structure for an embodiment of the present invention as illustrated in FIGS. 5, 6, 7, 8, and 9. For convenience in applying the description as it has been set forth with reference to FIG. 3 to corresponding parts in FIGS. 5, 6, 7, 8 and 9, corresponding letter reference characters have been used to designate similar parts.

With reference to the plan view of the car retarder of FIG. 5, the car retarder comprises a plurality of shoe beams B1 of a suitable length of about 6 feet 3 inches disposed end to end inside and outside of track rails 51 and 52. Suitable brake shoes S1 are secured to the sides of the shoe beams B1 toward the track rails 51 and 52. Although any number of shoe beams B1 can be used end to end to form a car retarder, 8 beams B1 are generally employed in end to end relationship in association with each side of each of the track rails 51 and 52.

The actuation of the beams B1 in accordance with the weights of the cars is accomplished at the ends of the beams B1 by mechanisms extending beneath the track rails between laterally spaced ties 53 as is shown in FIG. 7. A longitudinal section through a typical one of these mechanisms is shown in FIG. 6.

With reference to FIGS. 6 and 7, the principal elements of each of these mechanisms comprises rotary cams C1 disposed at the opposite sides of the trackway which support the weight applied to the track rails, a pair of channels CH1 extending underneath the track rails and disposed between the ties 53, a pair of hook arms HA1 disposed end to end and in opposing relationship between the channels CH1, and floating levers L1 at the ends of the mechanism engaging the respective hook arms HA1 and operatively engaging the adjoining ends of the outside shoe beams B1. The floating levers L1 have rollers 54 which bear upon the tops of the cams C1 and thereby support the weight applied to the track rails 51 and 52.

The cams C1 are keyed on short shafts 55 (see FIGS. 5 and 6) which are connected together end to end along each side of the trackway by suitable connecting shafts 56 and couplings 57.

A car retarder operating mechanism OM is fastened by bolts 58 to long ties 59 at one side of the trackway near the center of the car retarder longitudinally. This operating mechanism OM has a motor 60 coupled to rotate the shafts 56 on the associated side of the trackway through suitable reduction gearing 61.

The shafts 56 on the opposite sides of the trackway are rotated in synchronism and in the same direction by a chain 62 (see FIG. 9) extending beneath the track rails and connecting sprockets 63 which are keyed to the shafts 56 at the respective sides of the trackway. The chain 62 is guarded against damage by dragging equipment and the like by a suitable cover 64 extending underneath the track rails 51 and 52.

The shafts 55 to which the cams C1 are keyed are journaled in U-shaped bearing brackets 65 which are supported on adjoining ties 53 and are secured to the ties by bolts 66 as is shown in FIG. 7. These bearing brackets 65 also include oppositely disposed thrust bearing abutments 67 (see FIGS. 6 and 8) extending upwardly from the adjoining ties 53, substantially underneath the respective track rails 51 and 52, and spaced apart a distance corresponding to the width of a pair of channels CH1 having their lower webs notched out for the width of the bearing 67 as is shown in FIG. 8. Each pair of channels CH1 is tied together at the bottom by guide plates 68 welded to the underside of the channels CH1 as is shown in FIG. 7 at the points where the channels CH1 are notched out to receive the bearings 67. Thus, each of the guide plates 68 is correspondingly notched to cooperate with the abutments 67 to prevent longitudinal and lateral movement of the channels CH1 and yet permit vertical movement of the channels CH1 as required in accordance with different widths of wheels, and when opening the car retarder. Each of the guide plates 68 also has a central web 68a extending downwardly between the ties 53 and within the U-shaped structure of the bearing support 65.

The hook arms HA1 are formed as inverted channels and dispose end to end and in opposing relationship, one under each track rail, between the different pairs of channels CH1. The inner ends of the hook arms HA1 are supported within respective yokes 69 (see FIG. 6) extending between the channels CH1 and secured to the tops of the channels CH1 by bolts 70. The outer ends of the hook arms HA1 have upwardly extending hooks 71 formed thereon which hook over transverse pins 72 which are formed in the floating levers L1.

Each of the hook arms HA has an arcuate boss 73 formed in the upper side thereof through which weight is applied to the pressure applying mechanism. Each of the hook arms HA1 has a horizontal guide channel formed in the upper surface thereof on the inside of the associated track rail for receiving a driver 75 which is adjustable longitudinally within its channel by the placement of shims 76 between the driver 75 and an upwardly protruding shoulder 77a in the associated hook arm HA1.

The drivers 75 are formed with two laterally spaced upwardly extending lugs 77 engaging openings in the adjoining ends of inner shoe beams B1 as is shown in the plan view of FIG. 5. Similarly, the floating levers L1 are formed with two laterally spaced upwardly extending lugs 78 engaging openings in the adjoining ends of outer shoe beams B1.

The ends of the shoe beams B1 as well as the track rails rest on chairs 74 which are secured to the track rails by bolts 79 as is shown in FIG. 6. The chairs 74 also have suitable bosses securing one end of compression springs 80 (see FIG. 5), the opposite ends of which are connected in the ends of the shoe beams B1. In this manner each of the shoe beams B1 is biased outwardly from the associated track rail by the compression springs 80 at its ends. This biasing action is transmitted from the shoe beams through the lugs 77 and 78 of the drivers 75 and the floating levers L1 respectively to maintain the drivers 75 and the pins 72 of the levers L1 in close engagement with their cooperating parts of the associated hook arms HA1.

Since the car retarder is arranged to give a degree of retardation dependent upon the weight of a car being retarded, and since the weight of the car retarder is supported on the cams C1, this dead weight will produce retardation in addition to that produced by the weight of the cars. For example, in the case of a loaded car, the weight on a car axle may be 50,000 lbs., while with an empty car, the weight may be in the order of 10,000 lbs. If the dead weight of the car retarder for the length of the retarder corresponding to an axle be in the order of 6,000 lbs., then the dead weight retardation adds 60% to the retardation for the empty car while it adds only 12% of retardation for the heavier car. Thus, the degree of retardation is not directly proportional to the car weight unless the dead weight of the car retarder is cared for.

Thus the dead weight of the car retarder is compensated for by suitable compression springs 81 (see FIG. 7) disposed beneath the guide plates 68, which in turn are secured to the channels CH1 as has been described. These springs rest on suitable plates 82 which are secured to the underside of the ties 53 by bolts 66.

With reference to FIG. 4, a modified form of the weight-automatic car retarder is shown wherein the general structure is as has been described with reference to FIG. 3, but a modified floating lever L2 is provided wherein adjustment for wear of the brake shoes can readily be made by the tightening of the nut 83.

This floating lever L2 is constructed in two parts, 84 and 85. The member 84 is substantially the same as the lever L of FIG. 3 except that it carries no roller 31, but rather the roller 31 is carried by the member 85. The linkage member 85 is pivoted at the pivot point 86 at its left hand end in a socket formed in the upper side of the member 84. The members 84 and 85 are adjustably secured together by the bolt 87 and the nut 83, the bolt 87 being disposed substantially normal to a radius drawn from the pivot point 86.

From this structure it will be readily apparent that the tightening of the nut 83 moves the lugs 40 of the lever L2 closer to the track rail, and thus moves the brake shoes S in closer to the track rails as required to compensate for brake shoe wear.

The car retarders used in the embodiment illustrated in FIGS. 14 and 15 are of the character wherein the braking pressure is applied by springs, the pressure being adjustable by power driven means. A suitable car retarder of this type is disclosed, for example, in the U.S. patent to W. K. Howe, No. 1,852,572, dated April 5, 1932.

Car retarder operating mechanisms ROM are illustrated as being provided for the car retarders for selectively operating the car retarders to retardation or release positions as required. For the embodiments of the invention employing weight-automatic car retarders, the operating mechanism ROM illustrated in FIG. 3 is typical. Where the spring pressure car retarders are employed as in FIGS. 13 and 14, the car retarder mechanisms can be operated as is disclosed, for example, in the U.S. patent to W. K. Howe, No. 2,038,112, dated April 21, 1936.

For the embodiment of the invention illustrated in FIGS. 13 and 14, a weighing device is used at the entrance to the first of the hump and group car retarders for determining the degree of retardation required for cars entering the retarders. This weighing device comprises a weighing mechanism WD (see FIGS. 14A and 15A) associated with a weighing rail WR in approach to the car retarder with which the weighing device is associated. This weighing rail WR is disposed in a manner to weigh the load applied to the respective wheels on one side of the cars as the cars approach the associated car retarders, and thereby the weighing mechanism WD is actuated in accordance with the weight of cars and feeds such information to the system for use in determining the degree of retardation that may be required. The structure and organization of the weighing rail WR and the weighing mechanism WD may be of any suitable type, the weighing rail WR being disposed adjacent the main rail of the trackway so that the rim of each car wheel rides up onto the weighing rail and thereby causes actuation of the weighing mechanism WD. The weighing mechanism WD is illustrated as having an axially operable shaft 20 carrying a compression spring 21 and a contacting plunger 22 for selectively making contact between a common contact finger 23 and respective light weight, medium weight and heavy weight contact indicating fingers 24, 25 and 26 respectively. The weighing rail WR and weighing mechanism WD may be of any suitable type, such as the type that is disclosed, for example, in the U.S. patent application of Stuart M. Phelps, Ser. No. 386,095, filed October 14, 1953.

At the exit end of each of the car retarders is a directional antenna DA which is connected to suitable radar speed responsive apparatus as is shown in FIGS. 10 to 15 inclusive. This radar speed responsive apparatus is assumed to be of the continuous wave radar type employing the Doppler frequency principle discussed in general terms in Chapter 5 of the book entitled "Radar System Engineering" edited by Louis M. Ridenour and constituting volume I of the Radiation Laboratory Series, published by the McGraw-Hill Book Company of New York. This radar speed responsive apparatus is sometimes called an "interferometer." A suitable type of interferometer for this purpose is disclosed, for example, in the U.S. application of H. C. Kendall et al., Ser. No. 359,162, filed June 2, 1953.

Speed indicating relays S are provided for each interferometer for indicating different speeds at which car retarder control is to be effected. These relays are controlled through high pass electronic filters MPH which can be provided in the manner fully disclosed in the above mentioned Kendall et al. application. By this organization, each of the speed relays S becomes picked up whenever the speed of a car being detected by this associated interferometer is above the speed at which conduction through the associated high pass filter MPH becomes effective. The interferometer output governing the speed relays S can be adjusted so as to cause the speed relays to operate at different desired speeds in accordance with the requirements of practice as is described in the above mentioned Kendall et al. application.

An exit relay XR is associated with each of the interferometers in a manner to be picked up only upon the reception of a relatively strong signal. This occurs when a car is within substantially 10 feet, for example, of the directional antenna DA for the associated interferometer. The exit relays XR are energized through a suitable exit relay control unit of the interferometer as disclosed in the above mentioned Kendall et al. application. Each exit relay has associated therewith a slow acting exit relay XP.

A check relay CK is associated with each of the interferometers in a manner to be picked up only in response to the interferometer detecting the presence of a car in motion at any speed, provided the car has approached the associated car retarder thereby actuating an approach track relay ATR, or actuating the exit relay of the prior car retarder in the case of the second retarder at a double car retarder location.

Weight relays LW, MW and HW are provided in the system according to FIGS. 14 and 15 for governing the degree of retardation in accordance with the actuation of the associated weight detector mechanisms WD.

Having thus considered the general organization of the system, more detail consideration will now be given as to the circuit organization upon consideration of various typical operating conditions.

OPERATION

The condition of the apparatus illustrated in FIGS. 10 to 15 inclusive is that which the apparatus assumes when there are no cars within the vicinity of the car retarders. The car retarders are normally closed as selected by the associated check relays CK being in their dropped away positions. Thus, the hump car retarder illustrated in FIG. 10, for example, is in its closed position because of the closure of back contact 200 of relay CK to apply energy to the wire RET, thus calling for retardation and closing the car retarder in accordance with the energization of car retarder control circuits to be hereinafter more specifically considered with reference to FIG. 3.

With reference to FIG. 2, a tabulation is shown of the expected performance of cars having respective low, medium and high rolling resistances. This tabulation shows that for the grade of a typical hump classification yard a car with relatively low rolling resistance can be expected to increase its speed materially between the time of leaving the hump car retarder and the time of reaching a group car retarder (assuming that there is no intermediate retarders); a car of medium rolling resistance will maintain the same speed, or increase its speed slightly; and a car of high rolling resistance will enter a group car retarder at a speed less than the speed at which it has left the hump car retarder.

According to performance of a car as described above, different release speeds are selected for the group retarders as is indicated, for example, in the tabulation shown in FIG. 2. Thus, in the tabulation, it is illustrated that if the performance of a car is indicative of a relatively low rolling resistance, a release speed for a typical group car retarder is selected as five miles per hour; if a medium rolling resistance is indicated, a release speed for a typical group car retarder is selected as eight miles per hour; and if a higher rolling resistance is indicated, it is selected that no retardation is applied. It is to be understood that these release speeds are arbitrary and that the interferometers can be adjusted to provide any different speeds desired. It is also to be understood that adjustment of the interferometers to provide different release speeds may be made from time to time in accordance with different conditions such as changes in temperature and windage which may affect the rollability of the cars after leaving the group retarders.

In considering the mode of operation of the system according to the present invention upon passage of a car, reference will first be made to the simplified form of the invention shown in FIGS. 10 and 11 wherein only a single car retarder and its associated control apparatus is assumed to be provided both at the hump and at the point of entrance to the group of classification tracks.

Figure 10:
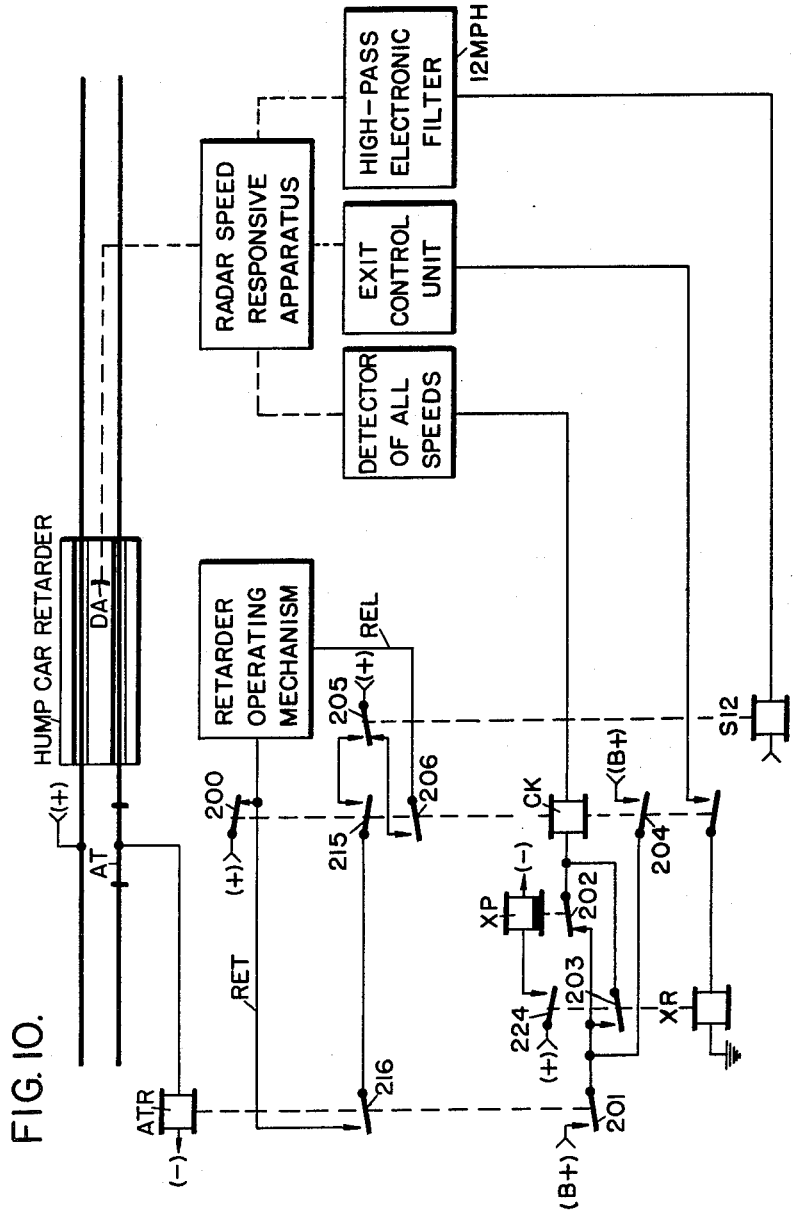
FIG. 10 illustrates the control organization for one embodiment of the present invention for the control of a hump car retarder of the weight-automatic type.

With reference to FIG. 10, in order that the radar speed responsive apparatus may cause operation of the car retarder mechanism only when a car is present or in immediate approach of the car retarder, a short approach track section AT is provided in approach of the hump car retarder (see FIG. 10) and similarly an approach track section AT1 is provided in approach of the group car retarder (see FIG. 11). Each of these approach track sections provides a series control circuit for picking up its associated track relay ATR whenever the associated track section AT is occupied by a car.

If it is assumed that a car which has been released at the hump progresses in approach of the hump car retarder at a speed above the desired release speed of the hump car retarder, the speed relay S–12 is picked up in accordance with the detection of the speed of the car by the directional antenna DA in combination with the radar speed responsive apparatus. Relay S–12 is picked up through a high-pass electronic filter 12MPH as is illustrated in FIG. 10, the detail circuit organization for the energization of a speed relay comparable to relay S–12 being fully disclosed in the above mentioned prior U. S. application of H. C. Kendall et al., Ser. No. 359,162, filed June 2, 1953, now Patent No. 3,125,315.

Upon the picking up of the approach track relay ATR, the check relay CK becomes picked up by energization from (B+) through front contact 201 of relay ATR, back contact 202 of relay XP connected in multiple with front contact 203 of relay XR, and the electronic control equipment of the radar speed responsive apparatus such as is disclosed in the above mentioned Kendall et al. application. Relay CK when picked up is maintained energized by a stick circuit closed at front contact 204 of relay CK shunting front contact 201 of relay ATR out of the circuit just described for the picking up of relay CK.

It is thus assumed that a car enters the hump car retarder at a speed above the release speed which has been assumed to be 12 miles per hour, with the car retarder closed, and with the degree of retardation governed automatically by the car retarder being of the weight-automatic type. When the speed of the car has been reduced to the release speed of 12 miles per hour, energy is applied to the release car retarder control wire REL upon the dropping away of the speed relay S–12 through back contact 205 of relay S–12 and back contact 206 of relay CK. With reference to FIG. 3, it is illustrated that the car retarder control relay RZ is energized at this time by the application of energy to the release wire REL. The circuit for the energization of relay RZ extends from (+), including back contact 205 of relay S–12, front contact 206 or relay CK, wire REL, contact 207 of a manual car retarder control level MCL, normally closed contact fingers 208 and 209 of the car retarder circuit controller and winding of relay RZ, to (−). The picking up of this relay applies energy to the car retarder operating motor M through front contact 210 which operates the cams of the car retarder in a clockwise direction so that the rotation of the cams through approximately a quarter of a revolution provides full release of the car retarder.

As is indicated in FIG. 3, the cams 211, 212 and 213 of the car retarder circuit controller are rotated always in the same direction and directly with the release cams of the car retarder. Thus upon rotation for a quarter of a revolution in a clockwise direction, the relay RZ is deenergized by the opening of contacts 208 and 209 upon the contract pusher 214 dropping into the recess 212a of the cam 212. Relay RZ when dropped away deenergizes the motor M by the opening of front contact 210 and thus stops the rotation of the car retarder cams after the car retarder has been opened to relieve pressure from the wheels of the car.

Assuming that release of the car retarder has been rendered effective after the rear wheels of the car have cleared the approach track circuit AT, no further retardation is applied to that car in case the speed should increase slightly so as to cause the speed relay S–12 to again become picked up. If, however, the release becomes effective when the car has just entered the car retarder, an increase in speed so as to cause the speed relay S–12 to again be picked up before the rear wheels of the car have left the approach track circuit AT provides that the car retarder will be closed again to provide added retardation in accordance with the application of energy to the retardation control wire RET through front contact 205 of relay S–12, front contact 215 of relay CK, and front contact 216 of relay ATR.

Thus, with reference to FIG. 3, the relay RZ becomes picked up to operate the motor M to close the car retarder in accordance with the energization of a circuit extending from (+), including front contact 205 of relay S–12, front contact 215 of relay CK, front contact 216 of relay ATR, contact 217 of the manual control lever MCL, contact fingers 218 and 219 of the car retarder circuit controller which are closed at this time and winding of relay RZ, to (−). The closure of front contact 210 of relay RZ initiates operation of the motor M and the motor drives the cams of the car retarder in a clockwise direction through substantially three-quarters of a revolution to raise the retarder and thereby close the retarder to again apply pressure against the wheels of the car in accordance with the car weight. The circuit just described for the relay RZ is maintained closed until the cam 213 of the circuit controller is rotated to its normal position as is illustrated wherein the contact pusher 220 opens the contacts 219 and 218 upon dropping into the recess 213a of the cam 213.

Inasmuch as the circuit just described which closes the car retarder may be only momentarily closed because of the short track section AT being momentarily occupied, it is provided that once operation has been initiated to close the car retarder, the relay RZ is maintained energized until the car retarder has reached its fully closed position. This is accomplished by the cam 211 of the car retarder circuit controller and the operation of its associated contacts. This cam is effective to cause completion of operation for either the closing or the opening of the car retarder once operation for either of these positions has been initiated. More specifically, with the car retarder closed as illustrated, the pusher 229 associated with the cam 211 maintains its associated contacts open, but if operation is initiated to open the car retarder, this pusher drops against a low surface 211a of the cam 211 and closes contact fingers 221 and 222. Thus energy is applied to the motor control relay RZ by a circuit extending from (+), including contact fingers 221 and 222 of the car retarder circuit controller, contact fingers 208 and 209 of the car retarder circuit controller and winding of relay RZ, to (−). When operation is completed, contact fingers 208 and 209 open the circuit, and the contact 222 is moved to center because of pusher 229 riding on the portion 311b of the cam 211.

If the car retarder is in its open position and a circuit has been closed calling for retardation, the initial operation of the cam 211 in a clockwise direction is effective to close the contact fingers 222 and 223 to thereby apply energy through the contact fingers 218 and 219 of the car retarder circuit controller to the winding of relay RZ. This energy is maintained until the car retarder is completely closed so that the pusher 220 drops into the recess 213a of the cam 213, thus insuring full closure of the retarder, even though the circuit initiating the closure of the retarder may have been only momentarily closed.

In accordance with the progress of a car through the hump car retarder illustrated in FIG. 10 to the point of picking up the relay XR as has been described, the slow acting repeater relay XP is picked up by the closure of its front contact 224. This opens a portion of the control circuit for the relay CK at back contact 202 but prior to this time the contact 203 of relay XR connected in multiple therewith is closed. As the car progresses further so that the exit relay XR becomes dropped away, upon the rear of the car becoming out of range of the directional antenna DA, the dropping away of relay XR opens the stick circuit for relay CK at front contact 203 and inasmuch as the exit relay XP is picked up at this time, the back contact 202 of this relay is opened and thus the check relay CK becomes dropped away. The dropping away of this relay closes the back contact 200 to apply energy to the wire RET which calls for closing of the retarder and restoration to the normal conditions that have been described as being effective when no car is present. It wil be noted that the dropping away of relay CK opens the car retarder release circuit which has been closed to open the car retarder at front contact 215.

Having thus considered how the cars are released at the hump at a predetermined speed of 12 miles per hour, for example, it will be assumed that a car proceeds to the group car retarder illustrated in FIG. 11, which is assumed to be of the weight-automatic type, without any intermediate retardation. Upon approach to this car retarder, the radar speed responsive apparatus senses, through its associated directional antenna DA1, the speed of the car as it approaches the associated car retarder. Thus the radar speed responsive apparatus energizes speed relays in accordance with the speed of the approaching car. If the car has relatively low rolling resistance, it has increased its speed to above 14 miles per hour, for example, and thus the frequency in the radar speed responsive apparatus that is indicative of speed is above the cut-off point of the high pass electronic filters provided in the control circuit of all of the speed relays S so that the relays S–5, S–8, S–12 and S–14 are all picked up. If, however, the rolling resistance of the car is medium, the speed is between 12 and 14 miles per hour upon approach to the group car retarder illustrated in FIG. 11 and thus all of the these speed relays are picked up except relay S–14 which requires a speed of 14 miles per hour or greater. Furthermore, if the car approaching the group car retarder illustrated in FIG. 11 is a car of high rolling resistance, the speed of the car is below 12 miles per hour and thus neither of the relays S–12 nor S–14 is picked up by the approach of this car.

By the time the car enters the approach track section AT1 so as to pick up the associated track relay ATR1, the speed relays are conditioned in accordance with the speed of the car as has been described, and the picking up of the relay ATR1 closes a pick up circuit for the check relay CK1. Thus the relay CK1 becomes picked up through front contact 225 of relay ATR1 and back contact 226 of relay XP1 connected in multiple with front contact 227 of relay XR1. This relay when picked up is maintained energized by a stick circuit including front contact 228 which shunts front contact 225 of relay ATR1 out of the pick up circuit.

Relays S–12 and S–14 are used as selecting relays to select the release speed at which the group car retarder should be opened. Inasmuch as these relays should always be indicative of the speed of the car as it approached the group car retarder, they are maintained energized by stick circuits dependent upon the check relay CK1 so that they are maintained in their initial position until the car for which control is being provided has left the car retarder.

If the speed of the car upon entering the group car retarder is above 14 miles per hour, for example, the relays S–12 and S–14 are both picked up, and upon the picking up of relay CK1, stick circuits are established for both of these relays. The stick circuit for relay S–12 extends from (+), including front contact 231 of relay S–12, front contact 232 of relay CK1 and lower winding of relays S–12, to (−). The stick circuit for relay S–14 extends from (+), including front contact 233 of relay S–14, front contact 234 of relay CK1 and lower winding of relay S–14, to (−). If the speed of the car upon entering the group car retarder is between 12 and 14 miles per hour, relay S–12 is picked up but not relay S–14, and if the car has high rolling resistance so that the speed of the car is below 12 miles per hour, neither of the relays S–12 nor S–14 is picked up upon entrance of a car into the group car retarder. If the car enters the group car retarder which is normally closed, there is no further acceleration of the car because of the braking pressure applied, and thus there can be no change in the conditions of the relays S–12 and S–14 after the car retarder has been entered. If the car has high rolling resistance so that it has been decelerating from 12 miles per hour, it will continue to decelerate going through the car retarder even if the car retarder is opened so that no retardation is applied as is called for by the tabulation according to FIG. 2.

To consider specifically the car retarder release circuits for cars of different rolling resistances, different release circuits will be described as they selectively apply energy to the release wire REL, it being assumed that the release wire REL is effective to open the car retarder by causing the operation of the motor M (see FIG. 3) according to a mode of operation that has been specifically described when considering the opening of the hump car retarder.

If it is assumed that a car of low rolling resistance is being retarded by the group car retarder illustrated in FIG. 11, the relays S–12 and S14 are both picked up at the time the car enters the group car retarder and the release speed relays S–5 and S–8 are also in their picked up positions. Because of the relays S–12 and S–14 both being picked up, it is selected that the release speed is 5 miles per hour and that the speed relay S–5 must be dropped away in order to render the opening of the group car retarder effective. Thus retardation is maintained until the relay S–5 is dropped away, and at this time energy is applied to the car retarder release wire REL through front contact 235 of relay CK1, front contact 236 of relay S–12, front contact 237 of relay S–14, and back contact 238 of relay S–5.

If it is a car having medium rolling resistance that is being retarded by the typical group car retarder, only the relay S–12 is picked up, and thus it is selected that the release speed for the car is 8 miles per hour, and release is rendered effective in accordance with the dropping away of relay S–8. Upon the dropping away of relay S–8, energy is applied to the release wire REL for opening the car retarder through front contact 235 of relay CK1, front contact 236 of relay S–12, back contact 237 of relay S–14, and back contact 239 of relay S–8.

If a car of high rolling resistance approaches the group car retarder illustrated in FIG. 11, the picking up of the check relay CK1 upon entrance of the car into the approach track section AT1 applies energy to the release wire REL to immediately open the car retarder. Wire REL is energized at this time through front contact 235 of relay CK1 and back contact 236 of relay S–12.

When a group car retarder has been opened as has been described with reference to FIG. 11, it is maintained open until the car has left the car retarder unless the speed of the car has increased subsequent to the car retarder being opened sufficiently to cause the governing speed relay S–5 or S–8 to again be picked up before the rear wheels of the car leave the approach track section AT1. More specifically, if a car of low rolling resistance increases in speed after the car retarder has been opened and its rear wheels still occupy the track section AT1, a circuit is closed to initiate the closure of the car retarder by the application of energy to the wire RET calling for retardation through front contact 235 of relay CK1, front contact 236 of relay S–12, front contact 237 of relay S–14, and front contact 238 of relay S–5. Under similar conditions of operation for a car of medium rolling resistance, the car retarder is closed by the energization of wire RET through front contact 235 of relay CK1, front contact 236 of relay S–12, back contact 237 of relay S–14 and front contact 239 of relay S–8.

As a car progresses through the group car retarder illustrated in FIG. 11, the exit relay XR1 is picked up when the car approaches the directional antenna DA1 and the picking up of this relay closes a circuit at front contact 240 to cause the picking up of its slow drop away repeater relay XP1. The stick circuit for the check relay CK1 is not interrupted by the opening of back contact 226 of relay XP1 because the front contact 227 of relay XR1 has been closed prior to this time, but when the car has left the car retarder and moves sufficiently away from the directional antenna DA1 to permit the dropping away of the exit relay XR1, the relay CK1 becomes dropped away because its stick circuit is open at both front contact 227 of relay XR1 and back contact 226 of relay XP1. With the relay CK1 dropped away, energy is applied to the wire RET for the closure of the car retarder through back contact 241 so that the car retarder becomes closed and normal conditions of the organization for the control of the group car retarder are restored, all release and retardation circuits that have been described prior to this time being opened at front contact 235 of the check relay CK1.

*FIGS. 12, 13A and 13B*

In practice, it is desirable to provide multiple car retarders at the hump and at the group locations rather than to employ just single long retarders. In doing this, each of the multiple car retarders has its own interferometer equipment and control apparatus substantially corresponding to that which has been described with reference to FIGS. 10 and 11 as being associated with single car retarders at these respective locations.

It will, therefore, be readily apparent that car retarder No. 1 of FIG. 12 is controlled by an organization similar to that which has been specifically considered with reference to FIG. 10, and it will be unnecessary to redescribe the mode of operation involved. The organization for controlling car retarder No. 2 is also similar to that described with reference to FIG. 10 except that there is no approach track section because car retarder No. 2 is immediately adjoining car retarder No. 1. However, the exit relay 1XR associated with car retarder No. 1 is employed with respect to the control of car retarder No. 2 in a capacity corresponding to the manner in which the approach track relay 1ATR is used in controlling the control apparatus associated with car retarder No. 1. In other words, the approach of a car to car retarder No. 2 is identified by the picking up of the exit relay 1XR associated with car retarder No. 1, and the picking up of this relay permits the picking up of the check relay 2CK associated with car retarder No. 2. Relay 2CK becomes picked up at this time by the energization of a circuit including front contact 242 of relay 1XR, back contact 243 of relay 2XP connected in multiple with front contact 244 of relay 2XR, winding of relay 2CK, and the radar speed responsive apparatus that is provided for the control of car retarder No. 2. Relay 2CK when picked up is maintained energized by a stick circuit including front contact 245 of relay 2CK which shunts front contact 242 of relay 1XR out of the circuit just described.

The picking up of relay 2CK is effective according to a mode of operation corresponding to that which has been described to permit the energization of the car retarder release wire 2REL when the speed of the car within the car retarder is reduced sufficiently to permit the dropping away of the speed relay 2S–12, which occurs at approximately 12 miles per hour. When the relay 2S–12 is dropped away, energy is applied to the car retarder release wire 2REL through back contact 246 of relay 2S–12 and front contact 247 of relay 2CK to thus cause the opening of car retarder No. 2.

If car retarder No. 2 is opened before a car is fully within the car retarder, the rear of the car still holds the exit relay 1XR associated with card retarder No. 1 energized, and under these conditions, should the car accelerate to a point to cause the picking up of the speed relay 2S–12, energy is applied to the wire 2RET to again apply retardation by car retarder No. 2 by a circuit including front contact 246 of relay 2S–12, front contact 248 of relay 2CK, and front contact 249 of relay 1XR.

It is to be understood that the operating circuit for the control of car retarder No. 2 is provided similar to that shown in FIG. 3 which has been described with reference to FIG. 10, and that even though the circuit just described through the front contact 249 of relay 1XR may only momentarily be closed, because of the dropping away of relay 1XR, the operation of the mechanism of car retarder No. 2 to its fully closed position is assured.

The exit relay 2XR associated with car retarder No. 2 is picked up when the car has progressed to a point relatively near the directional antenna 2DA by a mode of operation comparable to that which has been described for a corresponding relay with reference to FIG. 10, and the picking up of this relay causes the picking up of its associated repeater relay 2XP though front contact 250. When the car leaves car retarder No. 2, the dropping away of the exit relay 2XR prior to the dropping away of relay 2XP causes the check relay 2CK to be dropped away because of its circuit being opened at both front contact 244 of relay 2XR and back contact 243 of relay 2XP. Upon the dropping away of the check relay 2CK, the closure of back contact 251 applies energy to the wire 2RET to cause the closing of car retarder No. 2 and thus the completion of the restoration to normal of the conditions of the apparatus associated with car retarder No. 2.

It should be readily apparent from the organization that has been specifically considered for the control of the car retarder No. 2 that similar control can be provided for as many additional car retarder units as may be required to be added to the two adjoining units that are illustrated in FIG. 12 for the hump car retarders, each unit added having control equipment comparable to that illustrated for car retarder No. 2, and the operation of the equipment being initially rendered effective by the exit relay XR for the preceding car retarder as has been described when considering the mode of operation of the system associated with the control of car retarder No. 2.

With reference to FIGS. 13A and 13B, a condition is illustrated wherein two adjoining car retarders are provided as typical group car retarders, these group car retarders being assumed to be car retarders Nos. 3 and 4 of FIG. 1, and it is to be understood that the control organization provided for these car retarders is typical of that which is provided for each of the other corresponding pairs of group car retarders.

The apparatus provided for the control of car retarder No. 3 will be readily identified as being similar to that which has been described in detail with reference to FIG. 11 and thus it should be unnecessary to repeat the description of this organization. Likewise, the control apparatus associated with the car retarder No. 4 is also similar to that which has been described with reference to FIG. 11 except for certain modifications by which this control apparatus is rendered active by the exit relay 3XR of car retarder No. 3, rather than by an approach track relay ATR. Also, certain other modifications are necessary in accordance with the storage and transfer of information relative to the speed at which a car enters car retarder No. 3 so that the release speed for car retarder No. 4 may be governed accordingly.

The speed relays 4S–12 and 4S–14, rather than being controlled by the radar speed responsive apparatus associated with car retarder No. 4, are made repeaters of relays 3S–12 and 3S–14 in that their conditioning should be dependent upon the speed at which a car enters car retarder No. 3 rather than the speed at which the car enters car retarder No. 4. These relays 4S–12 and 4S–14 are conditioned upon the picking up of the exit relay 3XR when a car has approached sufficiently close to the directional antenna 3DA to cause this operation to take place. The pick up circuits are closed momentarily for the relays 4S–12 and 4S–14 so that the approach of a second car will be ineffective to change the setting of these relays. Thus relay 4S–12 becomes picked up if relay 3S–12 is energized at the time when the exit relay 3XR is picked up by the energization of a circuit extending from (+), including front contact 252 of relay 3XR, back contact 253 of relay 3XP, front contact 254 of relay 3S–12, wire 255, and winding of relay 4S–12 to (—). This relay when picked up is maintained energized by a stick circuit for its lower winding including front contact 256 of relay 4S–12 and front contact 257 of relay 4CK.

If relay 3S–14 is in its picked up position at the time when the relay 3XR is picked up, a circuit is closed for the energization of relay 4S–14 extending from (+), including front contact 252 of relay 3XR, back contact 253 of relay 3XP, front contact 258 of relay 3S–14, wire 259, and upper winding of relay 4S–14, to (—). This relay when picked up is maintained energized by a stick circuit for its lower winding including front contact 260 of relay 4S–14 and front contact 261 of relay 4CK.

At the same time that pick up energy is applied to the relays 4S–12 and 4S–14, a pick up circuit is closed for the check relay 4CK extending from (B+), through front contact 262 of relay 3XR, wire 263, back contact 264 of relay 4XP connected in multiple with front contact 265 of relay 4XR, winding of relay 4CK, and radar speed responsive apparatus associated with car retarder No. 4. The picking up of relay 4CK closes a stick circuit at front contact 266 shunting the front contact 262 of relay 3XR out of the circuit just described.

With the relays 4S–12 and 4S–14 selectively energized in accordance with the speed of the car when entering car retarder No. 3, and with the check relay 4CK picked up, the car retarder No. 4 is controlled to selectively provide its release speeds in a manner corresponding to that which has been described in detail with reference to FIG. 11 when considering the operation when only a single car retarder was involved.

In the absence of an approach track circuit for the car retarder No. 4, it is provided that the reclosing of car retarder No. 4, in case the speed of a car increased within the retarder after it is opened, is made dependent upon the front contact 267 of relay 3XR to provide a mode of operation comparable to that which has been described for the reclosing of car retarder No. 2 when the exit relay 1XR associated with car retarder No. 1 is energized. The restoration to normal conditions of the car retarder control apparatus associated with car retarder No. 2 is accomplished in the same manner as has been described for other car retarders when the car retarder No. 4 becomes vacated by a car.

Having considered specifically the control apparatus provided for a second car retarder as a group car retarder, it is to be understood that if more car retarders are required for group retardation, that each of the additional adjoining car retarders can be provided with control apparatus similar to that which has been shown and described as being associated with car retarder No. 4.

FIGS. 14A, 14B, 15A and 15B

According to the principles as described for the other embodiments of the invention, the car retarders are normally closed in accordance with the check relays CK being in their dropped away positions. Thus, the car retarder No. 1 of FIG. 14B is normally closed because of the application of energy to wire No. 4 through back contact 285 of relay 1CK1.

This form of the invention is similar in principle to the forms that have been described, and similar particularly to the embodiment disclosed in FIGS. 12 and 13, except that the system uses spring retarders of the general character disclosed, for example, in the U.S. patent to W. K. Howe, No. 2,038,112 dated April 21, 1936, rather than using car retarders of the weight-automatic type. Car retarders of this character as used in this embodiment of the present invention are assumed to have four positions to which they can be selectively operated, namely, an open position, No. 2 position (light retardation), No. 3 position (medium retardation), and No. 4 position (heavy retardation).

For the purpose of selecting the degree of retardation in accordance with the weight of a car, with reference to FIG. 14A, a weighing rail 1WR is provided immediately in approach to the hump car retarder No. 1, and it has associated therewith a suitable weighing device 1WD which has been described as being effective to register light, medium and heavy degrees of weight for cars passing over the weighing rail 1WR. Thus this device is used to select the respective light, medium or heavy degrees of retardation to be applied by the hump car retarders, and the actuation of the weighing device 1WD is in itself indicative of the approach of a car, and thus this device is used to take the place of the approach track section AT that has been described as being provided as a part of the embodiments of the invention that have already been described.

If the weighing device 1WD of FIG. 14A is actuated by a light weight car, the light weight relay 1LW becomes picked up by the energization of a circuit extending from (+), including contact fingers 23 and 24 of the weighing device 1WD, upper winding of relay 1LW, back contact 268 of relay 1MW, and back contact 269 of relay 1HW, to (−). Upon the picking up of this relay, the check relay 1CK1 is picked up by the closure of a circuit extending from (B+), including front contact 270 of relay 1LW, back contact 271 of relay 1XP1 connected in multiple with front contact 272 of relay 1XR1, and the electronic radar speed responsive apparatus associated with car retarder No. 1. The picking up of relay 1CK1 closes a stick circuit at front contact 273 to shunt the contact 270 out of the circuit just described. Upon the picking up of relay 1CK1, a stick circuit is closed for the light weight relay 1LW to maintain this relay energized after the car has left the weighing rail 1WR. This circuit includes front contact 274 of relay 1CK1, back contact 275 of relay 1HW, back contact 276 of relay 1MW, front contact 277 of relay 1LW and lower winding of relay 1LW.

If the car approaching the hump car retarder No. 1 is of medium weight, the medium weight relay 1MW is picked up rather than the relay 1LW by the energization of a circuit including contact fingers 23 and 25 of the weighing device 1WD, upper winding of relay 1MW and back contact 278 of relay 1HW. The closure of front contact 279 of relay 1MW is effective to cause the picking up of the relay 1CK1 in an obvious manner, and this relay when picked up provides stick energy for the relay 1MW through front contact 274 of relay 1CK1, back contact 280 of relay 1HW, front contact 281 of relay 1MW and lower winding of relay 1MW.

Similarly, if the car being weighed is of heavy weight, the relay 1HW becomes picked up by a circuit through contact fingers 23 and 26 of the weighing device 1WD and the upper winding of relay 1HW. The picking up of this relay causes the picking up of relay 1CK1 by the closure of its front contact 282 and relay 1CK1 in picking up provides stick energy for the relay 1HW through front contact 274 of relay 1CK1 and front contact 283 of relay 1HW.

It will be noted that the light and medium weight relays 1LW and 1MW have their pick up and stick circuits checked through the weight relays W of higher weights and thus the highest weight indicated is always the governing factor, whether it is indicated by the weighing of the first wheel of a car or a subsequent wheel of the same car, or whether a heavier weight is detected in a subsequent car of a multiple car cut.

If it is assumed that the car approaching the car retarder No. 1 is approaching at a speed above 12 miles per hour so that the speed relay 1S1-12 is in its picked up position at the time the check relay 1CK1 is picked up, the car retarder No. 1 is operated to a selected degree of retardation in accordance with the particular weight relay 1LW, 1MW or 1HW that has been picked up.

Thus, if the relay 1LW is picked up because of a light car approaching, the car retarder No. 1 is opened to its No. 2 position for light retardation in accordance with the energization of the car retarder control wire No. 2 through front contact 286 of relay 1S1-12, front contact 287 of relay 1CK1, and front contact 288 of relay 1LW.

It it is a medium weight car that is approaching car retarder No. 1, the car retarder is opened to its position of medium retardation in accordance with the application of energy to wire No. 3 through front contact 286 of relay 1S1-12, front contact 287 of relay 1CK1, and front contact 289 of relay 1MW.

If it is a heavy weight car that is approaching car retarder No. 1, the car retarder mechanism is maintained in its position for heavy retardation in accordance with the selected energization of the control wire No. 4 through front contact 286 of relay 1S1-12, front contact 287 of relay 1CK1, and front contact 290 of relay 1HW.

Whenever the speed of the car passing through the car retarder No. 1 is reduced to the predetermined release speed which is assumed to be 12 miles per hour, the speed relay 1S1-12 is dropped away by the radar speed responsive apparatus, and the dropping away of this relay applies energy to the wire 0 through back contact 286 of relay 1S1-12 and front contact 291 of relay 1CK1.

If, after the opening of car retarder No. 1, the car within the car retarder increases its speed so as to cause the relay 1S1-12 to be picked up for a second time, the picking up of this relay is effective to reapply the selected degree of retardation for that particular car in accordance with whichever one of the weight relays W has been picked up. After the second application of the retarder, the speed is again reduced so that the speed relay 1S1-12 is again dropped away and the dropping away of this relay is effective as has been described to cause the opening of the car retarder No. 1.

When the car passing through car retarder No. 1 approaches the directional antenna 1DA, the exit relay 1XR1 becomes picked up in a manner corresponding to that which has been described for similar exit relays XR in the other embodiments of the present invention. This relay when picked up causes the picking up of its associated repeater relay 1XP1 by the closure of front contact 292 but the check relay 1CK1 is maintained energized through front contact 272 of relay 1XR1.

In accordance with the picking up of relay 1XR1 prior to the picking up of relay 1XP1, weight information is transferred from the relays 1LW, 1MW and 1HW which are associated with the hump car retarder No. 1 to the weight relays 2LW, 2MW and 2HW which are associated with the hump car retarder No. 2. Thus, if the relay 1LW is picked up, the relay 2LW becomes picked up at this time by the energization of a circuit extending from (+), including back contact 297 of relay 1XP1, front contact 298 of relay 1XR1, front contact 299 of relay 1LW, wire 302, and upper winding of relay 2LW, to (−). If it is the relay 1MW that has been picked up in accordance with the weighing of a car, relay 2MW is picked up at this time by its energization through back contact 297 of relay 1XP1, front contact 298 of relay 1XR1, front contact 300 of relay 1MW, and wire 303. If the relay 1HW is picked up in accordance with the weighing of a heavy weight car, the corresponding relay 2HW associated with car retarder No. 2 becomes energized upon the picking up of relay 1XR1 through back contact 297 of relay 1XP1, front contact 298 of relay 1XR1, front contact 301 of relay 1HW, and wire 304.

Relay 1XR1 in picking up renders the picking up of the check relay 2CK1 associated with car retarder No. 2 effective by the energization of a circuit including front contact 293 of relay 1XF1, wire 294, and back contact 295 of relay 2XP1 connected in multiple with front contact 296 of relay 2XR1.

Immediately upon the picking up of relay 2CK1, and before the relay 1XP1 has time to be picked up, a circuit is momentarily closed to pick up a weight relay 2LW, 2MW or 2HW.

Upon the picking up of the check relay 2CK1, a stick circuit is provided for the particular weight relay 2LW, 2MW or 2HW that has been picked up by way of transfer of the weight information associated with the hump car retarder No. 1 as has been described. Thus, if it is the relay 2LW that has been picked up, this relay is maintained picked up by a stick circuit for its lower winding including front contact 305 of relay 2CK1, back contact 306 of relay 2HW, back contact 307 of relay 2MW, and front contact 308 of relay 2LW. Similarly, if the relay 2MW has been picked up, stick energy is provided for this relay through front contact 305 or relay 2CK1, back contact 309 of relay 2HW, and front contact 310 of relay 2MW. If it is the relay 2HW that has been picked up, stick energy is provided for this relay through front contact 305 of relay 2CK1, and front contact 311 of relay 2HW. When relay 1XP1 becomes picked up it opens the pick up circuits that have been described at back contact 297 to provide that another car can now actuate the weight detector 1WD without affecting the weight storage as set up for the first car in a relay 2LW, 2MW or 2HW.

Car retarder No. 2 is normally closed in its position of maximum retardation in accordance with energy being applied to its control wire No. 4 through back contact 312 of relay 2CK1. When relay 2CK1 becomes picked up, however, the degree of retardation is set in accordance with the particular weight relay 2LW, 2MW or 2HW that may be picked up. Assuming that retardation is called for by reason of the speed of a car approaching car retarder No. 2 being such as to cause the speed relay 2S–12 to be picked up, the degree of retardation is selected as light by application of energy to wire No. 2 if relay 2LW is picked up. Wire No. 2 is energized at this time through front contact 313 of relay 2S–12, front contact 314 of relay 2CK1, and front contact 315 of relay 2LW. If, however, the relay 2MW is picked up at this time because of the car approaching being of medium weight, medium retardation is called for, and energy is applied to the car retarder control wire No. 3 through front contact 313 of relay 2S–12, front contact 314 of relay 2CK1, and front contact 316 of relay 2MW. If it is a heavy car that is approaching car retarder No. 2, energy is maintained on the control wire No. 4 through front contact 313 of relay 2S–12, front contact 314 of relay 2CK1, and front contact 317 of relay 2HW.

When the rear end of the car assumed to be entering car retarder No. 2 gets out of range of the directional antenna 1DA sufficiently to cause the dropping away of the exit relay 1XR1, the apparatus associated with the control of car retarder No. 1 is restored to its normal condition in a manner corresponding to that which has been described with reference to other embodiments of the invention, and it is thus properly conditioned for the control of car retarder No. 1 in accordance with the approach of a second car. The dropping away of the exit relay 1XR1 removes energy from the pick up circuit of the check relay 2CK1 that is associated with car retarder No. 2, but this check relay is maintained picked up by its stick circuit including front contact 318 which is in multiple with front contact 293 of relay 1XR1.

When the speed of a car in car retarder No. 2 has been reduced sufficiently to cause the dropping away of the speed relay 2S–12, the dropping away of this relay removes energy from the retarder control wires No. 2, 3 and 4 by the opening of front contact 313, and energy is applied to the wire No. 0 to open the car retarder through back contact 313 of relay 2S–12 and front contact 319 of the check relay 2CK1. Thus the car in car retarder No. 2 becomes released at the predetermined speed which is assumed to be 12 miles per hour, but if this car increases its speed sufficiently to cause its relay 2S–12 to become again picked up, with the check relay 2CK1 still energized, the car retarder No. 2 is operated to a position for retardation in accordance with the weight of the car as was described for initial approach of the car to car retarder No. 2.

When a car in car retarder No. 2 becomes sufficiently close to the directional antenna 2DA to pick up the exit relay 2XR1, this relay is picked up through front contact 320 of check relay 2CK1 and the picking up of relay 2XR1 causes the picking up of its repeater relay 2XP1 by the closure of front contact 321. Relay 2XP1 in picking up opens the circuit for the check relay 2CK1 at back contact 295, but front contact 296 of relay 2XR1 is closed so the check relay 2CK1 is maintained picked up until the car leaves car retarder No. 2 and becomes sufficiently out of range of the directional antenna 2DA so as to cause the dropping away of the exit relay 2XR1. At this time, the relay 2CK1 becomes dropped away and the opening of its front contact 305 opens the stick circuits for the weight relays 2LW, 2MW and 2HW so as to cause the dropping away of whichever one of these relays may have been energized.

It is to be understood that additional car retarders can be provided as required in practice adjoining car retarder No. 2, such car retarders being provided with directional antennas DA and radar speed responsive apparatus and control circuits corresponding to those which have been specifically described as being associated with car retarder No. 2. In each case, the exit relay XR of the preceding adjoining car retarder is used as an approach control to render the control of the car retarder effective in accordance with the weight and the speed of the approaching car.

Consideration will now be given to the control of group car retarders Nos. 3 and 4 when these car retarders are of the spring pressure type as is assumed in the circuit organization illustrated in FIGS. 15A and 15B. These car retarders are normally closed by reason of energy being applied to their No. 4 control wires by back contacts 321 and 322 of relays 3CK1 and 4CK1 respectively.

When a car approaches car retarder No. 3, the weight detector 3WD is actuated, and in accordance therewith a weight relay 3LW, 3MW or 3HW is picked up and maintained energized by a circuit organization similar to that which has been specifically described with reference to FIG. 14A for the control of corresponding relays 1LW, 1MW and 1HW.

In accordance with the picking up of a weight indication relay 3LW, 3MW or 3HW, the check relay 3CK1 becomes picked up by the energization of a circuit similar to that which has been described with reference to FIG. 14A for the picking up of relay 1CK1.

Upon the picking up of the check relay 3CK1, the car retarder No. 3 is opened, or adjusted to a desired degree of retardation, in accordance with the speed of the approaching car as determined by the radar speed responsive apparatus. If it is assumed that the car is approaching at a speed of 14 miles per hour, or higher, and it is assumed that the relay 3LW has been picked up as indicative of the car being of light weight, energy is applied to the light retardation control wire No. 2 for car retarder No. 3 through front contact 322 of relay 3CK1, front contact 323 of relay 3S1–12, front contact 324 of relay S31–14, front contact 325 of relay 3S1–5, and front contact 326 of relay 3LW. It will be readily apparent that energy fed through the same group of speed contacts is applied to wire No. 3 through front contact 327 if relay 3MW is picked up and similarly the control wire No. 4 is energized through front contact 328 if a heavy car is indicated by the energization of relay 3HW.

The picking up of relays 3S1–12 and 3S1–14 is rendered effective in the same manner as has been described with reference to FIG. 12A, and these relays when picked up are maintained energized by stick circuits as long as the check relay 3CK1 is maintained picked up. The release speed for car retarder No. 3, according to the circuit organization of FIG. 15A, is selected in the same manner as has been heretofore described with reference to FIG. 13A and thus it should be unnecessary to redescribe specifically this circuit organization. It is therefore provided that if relays 3S1–12 and 3S1–14 have both been picked up by the approach of a car to car retarder No. 3, retardation is maintained until the low speed relay 3S1–5 is dropped away, and at this time the shifting of contact 325 of relay 3S1–5 is effective to remove retardation control energy from car retarder No. 3 and apply energy to the car retarder release wire 0 for the opening of the car retarder. Similarly, if the speed of the car approaching car retarder No. 3 has been such as to have caused the picking up of relay 3S1–12 but not relay 3S1–14, it is selected that the release speed is at 8 miles per hour and thus upon the dropping away of relay 3S1–8, the shifting of contact 329 of relay 3S1–8 removes energy from the retardation control wires and applies energy for release of the car retarder to the wire No. 0.

When a car proceeds through the car retarder No. 3 sufficiently to cause the picking up of the exit relay 3XR1, the picking up of this relay causes the transfer of the weight description from the weight relays 3LW, 3MW and 3HW to the weight relays 4LW, 4MW and 4HW of FIG. 15B over the wires 330, 331, and 332 respectively. This is all accomplished in a manner that will be recognized as being similar to that which has been specifically described with reference to FIGS. 14A and 14B.

At the same time as transfer of the weight description is accomplished, the speed indicating relays 4S1–12 and 4S1–14 (see FIG. 15B) become energized as repeaters of the relays 3S1–12 and 3S1–14 respectively. Thus, if relay 3S1–12 of FIG. 15A is picked up the relay 4S1–12 becomes energized upon the picking up of the exit relay 3XR1 through front contact 333 of relay 3XR1, back contact 334 of relay 3XP1, front contact 335 of relay 3S1–12, and wire 336. If the relay 3S1–14 of FIG. 15A is in its picked up position at the time when the exit relay 3XR1 is picked up, relay 4S1–14 of FIG. 15B becomes picked up by the energization of a circuit including front contact 333 of relay 3XR1, back contact 334 of relay 3XP1, front contact 337 of relay 3S1–14 and wire 338. The picking up of relay 3XR1 causes the picking up of the check relay 4CK1 of FIG. 15B by the energization of a circuit including front contact 339 of relay 3XR1 (see FIG. 15A), wire 340, back contact 341 of relay 4XP1 connected in multiple with front contact 342 of relay 4XR1, and the radar speed responsive apparatus associated with car retarder No. 4.

The picking up of the check relay 4CK1 renders the control of the car retarder No. 4 effective in accordance with the condition of the speed relays and in accordance with the condition of the weight indicating relays in a manner corresponding to that which has been specifically described with reference to the control of car retarder No. 3 with reference to FIG. 15A.

Restoration of the apparatus associated with car retarders Nos. 3 and 4 after passage of a car is rendered effective in a manner comparable to that which has been described for restoration of the apparatus subsequent to the passage of a car through the car retarders Nos. 3 and 4 of FIGS. 13A and 13B.

It will be noted that in the circuit organization according to FIGS. 14A and 14B, 15A and 15B that each car retarder after being opened can immediately be closed for a second time, irrespective of the progress of the car within the car retarder, dependent solely upon the re-energization of the governing speed relays S for the associated car retarder. This is of course assuming that the car being within the limits of the car retarder maintains the check relay CK for the associated car retarder picked up. This condition is slightly different from the condition which has been described with reference to FIGS. 10 and 11, for example, wherein the closing of a car retarder for a second time for any one car is dependent upon the car being within the approach track section AT as indicative of the car retarder having been opened early in the passage of the car. It will be readily apparent that either system for the closure of a car retarder for a second time in the retardation of a car may be employed in accordance with the requirements of practice.

Having described certain specific embodiments of the present invention by way of illustrations of typical forms which the invention may assume, it is to be understood that these forms are selected principally to facilitate the disclosure of the invention rather than to limit the number of forms the invention may assume, and it is to be further understood that various adaptations, modifications and alterations may be made to the specific form shown in accordance with the requirements of practice except as limited by the appending claims.

What I claim is:

1. In a car retarder control system for a classification yard, the combination comprising:
    (a) a car retarder disposed at an intermediate point in a stretch of track in a classification yard, said car retarder being selectively operable to positions of different degrees of braking and to a nonbraking position,
    (b) weight registration means responsive to the passage of a car over a predetermined point along said stretch of track in advance of said retarder for registering a weight classification for said car,
    (c) rolling resistance registration means responsive to the free rolling passage of said car over a predetermined portion of said track in approach of said retarder for registering a rolling characteristic classification for said car, and
    (d) operating means for said retarder controlled jointly by said weight registration means and said rolling resistance registration means for first operating said retarder to a degree of braking in accordance with the weight classification of said car as registered by said weight registration means and for subsequently operating said retarder to said nonbraking position when the speed of said car within the retarder is reduced to a speed selected in accordance with said rolling resistance registration means.

2. The system according to claim 1 wherein said operating means for said retarder includes radar speed measuring apparatus for measuring the speed of the car when within the vicinity of the retarder.

3. The system according to claim 1 wherein said rolling resistance registration means includes a system for measuring the acceleration of the car as it rolls freely over a predetermined test section in said stretch of track in approach of said retarder.

4. In a car retarder control system for a classification yard, the combination comprising:
   (a) a stretch of track extending from a hump in a classification yard to a group of classification tracks having a hump car retarder disposed therein near the hump and a group car retarder disposed therein near the group of classification tracks, each of said car retarders being selectively operable to braking and nonbraking positions and at least the group retarder being selectively operable to positions providing different degrees of braking pressures,
   (b) control means governed by the speed of a car within said hump retarder for operating said hump retarder to its nonbraking position when the speed of the car is reduced to a predetermined value,
   (c) weight registration means responsive to the passage of a car over a predetermined point along said stretch of track in advance of said group retarder for registering a weight classification for that car,
   (d) rolling resistance registration means controlled by the presence of a car in the immediate approach of the group retarder and by the speed of the car at that time for registering a rolling resistance classification for that car, and
   (e) operating means for said group retarder controlled jointly by said weight registration means and said rolling resistance registration means for first operating said group retarder to a degree of braking in accordance with the weight classification of the car and for subsequently operating said group retarder to its nonbraking position when the speed of the car within the group retarder is reduced to a speed selected in accordance with said rolling resistance registration means.

5. The system according to claim 4 wherein the registration of rolling resistance by said rolling resistance registration means is dependent upon a comparison of the speed of a car when released from the hump retarder with the speed of the car when it is about to enter the group retarder.

6. A system for controlling the speed of each of a plurality of separate railway cars which rolls by gravity through a classification yard to its destination on a selected classification track and passes through a hump retarder and later also through at least one group retarder, each of said retarders being controllable between a nonbraking condition and at least one braking condition, the combination comprising, first speed measuring means for producing a signal which is proportional to the velocity of each car as it moves through said hump retarder, control means for said hump retarder governed at least in part by said first speed measuring means for operating said hump retarder to release all cars from said hump retarder at the same predetermined speed, second speed measuring means for measuring the speed of each car after it has travelled a predetermined distance after leaving said hump retarder but before entering said group retarder, said second speed measuring means also producing a signal which is proportional to the measured speed of each car, computing means governed by at least said second speed measuring means for selecting a particular speed at which each car should be released from said group retarder, and control means for said group retarder governed by the speed of each car passing therethrough and also by said computing means for operating said group retarder to release each car therefrom at the speed selected by said computing means for that car.

7. Automatic control apparatus for a classification yard having a master retarder, one or more group retarders and one or more storage tracks, said apparatus comprising, in combination, means for controlling the speed of each cut leaving the master retarder of said yard to the same preselected speed, means for measuring the speed of each cut in approach to a group retarder, means for computing the rolling resistance of each cut in dependence on said preselected speed and said measured speed, and means for controlling the speed of cuts leaving the group retarders in accordance with the computed rolling resistance of each cut.

References Cited in the file of this patent

UNITED STATES PATENTS

| | | |
|---|---|---|
| 1,324,113 | Haines | Dec. 9, 1919 |
| 1,681,131 | Prescott | Aug. 14, 1928 |
| 1,690,915 | Wenzel | Nov. 6, 1928 |
| 1,766,539 | Prescott | June 24, 1930 |
| 1,927,201 | Bone | Sept. 19, 1933 |
| 2,045,201 | Rabourdin | June 23, 1936 |
| 2,047,679 | Faus | July 14, 1936 |
| 2,331,125 | Logan | Oct. 5, 1943 |
| 2,361,466 | Fitzsimmons | Oct. 31, 1944 |
| 2,477,567 | Barker | Aug. 2, 1949 |
| 2,499,812 | Beltman | Mar. 7, 1950 |
| 2,629,865 | Barker | Feb. 24, 1953 |
| 2,727,138 | Agnew | Dec. 13, 1955 |
| 2,751,492 | Fitzsimmons | June 19, 1956 |